US008892475B2

(12) United States Patent
Tallent, Jr. et al.

(10) Patent No.: US 8,892,475 B2
(45) Date of Patent: Nov. 18, 2014

(54) PROVISION OF AUTHORIZATION AND OTHER SERVICES

(75) Inventors: Guy S. Tallent, Jr., Hoboken, NJ (US); Paul A. Donfried, Richmond, MA (US); George M. (Mack) Hicks, Palm Springs, CA (US); Elizabeth Lee, Lafayette, CA (US)

(73) Assignee: Identrust, Inc., San Francisco, CA (US)

( * ) Notice: Subject to any disclaimer, the term of this patent is extended or adjusted under 35 U.S.C. 154(b) by 799 days.

(21) Appl. No.: 11/398,329

(22) Filed: Apr. 4, 2006

(65) Prior Publication Data

US 2006/0179008 A1 Aug. 10, 2006

Related U.S. Application Data

(63) Continuation of application No. 09/950,059, filed on Sep. 10, 2001, now Pat. No. 7,072,870.

(60) Provisional application No. 60/231,313, filed on Sep. 8, 2000, provisional application No. 60/231,315, filed on Sep. 8, 2000, provisional application No. 60/231,318, filed on Sep. 8, 2000.

(51) Int. Cl.
G06Q 20/00 (2012.01)
G06Q 20/08 (2012.01)

(52) U.S. Cl.
CPC ................... *G06Q 20/0855* (2013.01)
USPC ................ 705/76; 705/65; 713/156; 713/172

(58) Field of Classification Search
USPC .................. 705/50–80, 76, 65; 713/156, 172
See application file for complete search history.

(56) References Cited

U.S. PATENT DOCUMENTS

| 4,304,990 | A | 12/1981 | Atalla |
| 5,048,085 | A | 9/1991 | Abraham et al. |
| 5,191,193 | A | 3/1993 | LeRoux |
| 5,353,350 | A | 10/1994 | Unsworth et al. |

(Continued)

FOREIGN PATENT DOCUMENTS

| EP | 0 784 282 A2 | 7/1997 |
| WO | WO 96/31965 A1 | 10/1996 |

(Continued)

OTHER PUBLICATIONS

ABA School of Bank Card Management, http://www.aba.com/aba/ConferencesandEducation/SCH_BC99.asp, Jun. 1999.

(Continued)

*Primary Examiner* — Calvin L Hewitt, II
*Assistant Examiner* — John M Winter
(74) *Attorney, Agent, or Firm* — Eric Sophir; Dentons US LLP

(57) ABSTRACT

Methods, apparati, and computer-readable media for providing authorization and other services. In a preferred embodiment, an authorization service includes both a messaging specification and a set of rules that govern its use. A first customer wishing to use the authorization service prepares a request that complies with the service's messaging specification and transmits it to a first participant. The first participant transmits the request to a second participant, which processes the request according to authorization information provided by a second customer and rules that have been specified for the service. The second participant then prepares a response that complies with the service's messaging specification.

18 Claims, 21 Drawing Sheets

(56) References Cited

U.S. PATENT DOCUMENTS

| | | |
|---|---|---|
| 5,389,738 A | 2/1995 | Piosenka et al. |
| 5,406,630 A | 4/1995 | Piosenka et al. |
| 5,448,045 A | 9/1995 | Clark |
| 5,453,601 A | 9/1995 | Rosen |
| 5,511,121 A | 4/1996 | Yacobi |
| 5,557,518 A | 9/1996 | Rosen |
| 5,604,801 A | 2/1997 | Dolan et al. |
| 5,615,269 A | 3/1997 | Micali |
| 5,623,637 A | 4/1997 | Jones et al. |
| 5,638,446 A | 6/1997 | Rubin |
| 5,659,616 A | 8/1997 | Sudia |
| 5,668,878 A | 9/1997 | Brands |
| 5,671,279 A | 9/1997 | Elgamal |
| 5,677,955 A | 10/1997 | Doggett et al. |
| 5,680,455 A | 10/1997 | Linsker et al. |
| 5,689,565 A | 11/1997 | Spies et al. |
| 5,694,471 A | 12/1997 | Chen et al. |
| 5,703,949 A | 12/1997 | Rosen |
| 5,706,427 A | 1/1998 | Tabuki |
| 5,709,677 A | 1/1998 | Fox et al. |
| 5,717,989 A | 2/1998 | Tozzoli et al. |
| 5,721,781 A | 2/1998 | Deo et al. |
| 5,745,571 A | 4/1998 | Zuk |
| 5,745,574 A | 4/1998 | Muftic |
| 5,754,772 A | 5/1998 | Leaf |
| 5,784,612 A | 7/1998 | Crane et al. |
| 5,809,144 A | 9/1998 | Sirbu et al. |
| 5,815,657 A | 9/1998 | Williams et al. |
| 5,841,866 A | 11/1998 | Bruwer et al. |
| 5,842,211 A | 11/1998 | Horadan et al. |
| 5,845,260 A | 12/1998 | Nakano et al. |
| 5,847,374 A | 12/1998 | Menconi |
| 5,850,442 A | 12/1998 | Muftic |
| 5,861,662 A | 1/1999 | Candelore |
| 5,870,473 A | 2/1999 | Boesch et al. |
| 5,889,863 A | 3/1999 | Weber |
| 5,892,900 A | 4/1999 | Ginter et al. |
| 5,903,882 A * | 5/1999 | Asay et al. ............ 705/44 |
| 5,909,492 A | 6/1999 | Payne et al. |
| 5,913,210 A | 6/1999 | Call |
| 5,920,629 A | 7/1999 | Rosen |
| 5,920,847 A | 7/1999 | Kolling et al. |
| 5,937,068 A | 8/1999 | Audebert |
| 5,943,424 A | 8/1999 | Berger et al. |
| 5,944,789 A | 8/1999 | Tzelnic et al. |
| 5,956,404 A | 9/1999 | Schneier et al. |
| 5,958,051 A | 9/1999 | Renaud et al. |
| 5,970,475 A | 10/1999 | Barnes et al. |
| 5,987,440 A | 11/1999 | O'Neil et al. |
| 5,991,750 A | 11/1999 | Watson |
| 6,003,007 A | 12/1999 | DiRienzo |
| 6,003,765 A | 12/1999 | Okamoto |
| 6,014,646 A | 1/2000 | Vallee et al. |
| 6,029,150 A | 2/2000 | Kravitz |
| 6,035,402 A | 3/2000 | Vaeth et al. |
| 6,038,551 A | 3/2000 | Barlow et al. |
| 6,039,248 A | 3/2000 | Park |
| 6,044,350 A | 3/2000 | Weiant, Jr. et al. |
| 6,044,462 A | 3/2000 | Zubeldia et al. |
| 6,052,785 A | 4/2000 | Lin et al. |
| 6,067,621 A | 5/2000 | Yu et al. |
| 6,072,870 A | 6/2000 | Nguyen et al. |
| 6,081,790 A | 6/2000 | Rosen |
| 6,085,168 A | 7/2000 | Mori et al. |
| 6,085,321 A | 7/2000 | Gibbs et al. |
| 6,092,196 A | 7/2000 | Reiche |
| 6,092,201 A | 7/2000 | Turnbull et al. |
| 6,105,012 A | 8/2000 | Chang et al. |
| 6,115,642 A | 9/2000 | Brown et al. |
| 6,125,349 A | 9/2000 | Maher |
| 6,134,327 A | 10/2000 | Van Oorschot et al. |
| 6,134,550 A | 10/2000 | Van Oorschot et al. |
| 6,138,107 A | 10/2000 | Elgamal |
| 6,141,679 A | 10/2000 | Schaefer et al. |
| 6,154,844 A | 11/2000 | Touboul et al. |
| 6,157,721 A | 12/2000 | Shear et al. |
| 6,157,917 A | 12/2000 | Barber |
| 6,157,920 A | 12/2000 | Jakobsson et al. |
| 6,157,927 A | 12/2000 | Schaefer et al. |
| 6,170,058 B1 | 1/2001 | Kausik |
| 6,175,921 B1 | 1/2001 | Rosen |
| 6,182,052 B1 | 1/2001 | Fulton |
| 6,185,683 B1 | 2/2001 | Ginter et al. |
| 6,209,091 B1 | 3/2001 | Sudia et al. |
| 6,223,291 B1 | 4/2001 | Puhl et al. |
| 6,233,339 B1 | 5/2001 | Kawano et al. |
| 6,236,972 B1 | 5/2001 | Shkedy |
| 6,272,675 B1 | 8/2001 | Schrab et al. |
| 6,285,991 B1 | 9/2001 | Powar |
| 6,292,569 B1 | 9/2001 | Shear et al. |
| 6,301,658 B1 * | 10/2001 | Koehler ............ 713/155 |
| 6,304,658 B1 | 10/2001 | Kocher et al. |
| 6,314,517 B1 | 11/2001 | Moses et al. |
| 6,324,525 B1 | 11/2001 | Kramer et al. |
| 6,327,578 B1 * | 12/2001 | Linehan ............ 705/65 |
| 6,330,551 B1 | 12/2001 | Burchetta et al. |
| 6,341,353 B1 | 1/2002 | Herman |
| 6,353,812 B2 | 3/2002 | Frankel et al. |
| 6,356,878 B1 | 3/2002 | Walker et al. |
| 6,363,365 B1 | 3/2002 | Kou |
| 6,363,479 B1 | 3/2002 | Godfrey et al. |
| 6,370,249 B1 | 4/2002 | Van Oorschot |
| 6,373,950 B1 | 4/2002 | Rowney |
| 6,385,651 B2 | 5/2002 | Dancs et al. |
| 6,438,690 B1 * | 8/2002 | Patel et al. ............ 713/155 |
| 6,449,598 B1 | 9/2002 | Green et al. |
| 6,477,513 B1 | 11/2002 | Walker |
| 6,490,358 B1 | 12/2002 | Geer, Jr. et al. |
| 6,490,367 B1 | 12/2002 | Carlsson et al. |
| 6,496,858 B1 | 12/2002 | Frailong et al. |
| 6,510,513 B1 | 1/2003 | Danieli |
| 6,510,518 B1 | 1/2003 | Jaffe et al. |
| 6,523,027 B1 | 2/2003 | Underwood |
| RE38,070 E | 4/2003 | Spies et al. |
| 6,560,581 B1 | 5/2003 | Fox et al. |
| 6,598,027 B1 | 7/2003 | Breen, Jr. et al. |
| 6,601,233 B1 | 7/2003 | Underwood |
| 6,601,759 B2 | 8/2003 | Fife et al. |
| 6,609,128 B1 | 8/2003 | Underwood |
| 6,633,878 B1 | 10/2003 | Underwood |
| 6,643,701 B1 | 11/2003 | Aziz et al. |
| 6,658,568 B1 | 12/2003 | Ginter et al. |
| 6,675,153 B1 | 1/2004 | Cook et al. |
| 6,704,873 B1 | 3/2004 | Underwood |
| 6,711,679 B1 | 3/2004 | Guski et al. |
| 6,715,080 B1 | 3/2004 | Starkovich et al. |
| 6,718,470 B1 | 4/2004 | Adams et al. |
| 6,718,535 B1 | 4/2004 | Underwood |
| 6,763,459 B1 | 7/2004 | Corella |
| 6,766,454 B1 | 7/2004 | Riggins |
| 6,853,988 B1 | 2/2005 | Dickinson et al. |
| 6,865,674 B1 | 3/2005 | Mancini et al. |
| 6,889,325 B1 | 5/2005 | Sipman et al. |
| 6,973,571 B2 | 12/2005 | Lee et al. |
| 7,000,105 B2 | 2/2006 | Tallent, Jr. et al. |
| 7,072,870 B2 | 7/2006 | Tallent, Jr. et al. |
| 7,076,784 B1 | 7/2006 | Russell et al. |
| 7,080,251 B2 | 7/2006 | Fujishiro et al. |
| 7,080,409 B2 | 7/2006 | Eigeles |
| 7,100,195 B1 | 8/2006 | Underwood |
| 7,130,998 B2 | 10/2006 | Balfanz et al. |
| 7,165,178 B2 | 1/2007 | Gien et al. |
| 7,167,985 B2 | 1/2007 | Ahmed |
| 7,177,839 B1 | 2/2007 | Claxton |
| 7,200,573 B2 | 4/2007 | Miller et al. |
| 7,206,805 B1 | 4/2007 | McLaughlin, Jr. |
| 7,424,616 B1 | 9/2008 | Brandenburg et al. |
| 2001/0011255 A1 | 8/2001 | Asay et al. |
| 2001/0020228 A1 | 9/2001 | Cantu et al. |
| 2001/0034724 A1 | 10/2001 | Thieme |
| 2002/0029194 A1 | 3/2002 | Lewis et al. |
| 2002/0029200 A1 * | 3/2002 | Dulin et al. ............ 705/67 |
| 2002/0029337 A1 | 3/2002 | Sudia |
| 2002/0029350 A1 | 3/2002 | Cooper et al. |

(56) References Cited

U.S. PATENT DOCUMENTS

| | | | |
|---|---|---|---|
| 2002/0046188 | A1 | 4/2002 | Burges et al. |
| 2002/0059143 | A1 | 5/2002 | Frankel |
| 2002/0065695 | A1 | 5/2002 | Francoeur et al. |
| 2002/0095579 | A1 | 7/2002 | Yoshiura et al. |
| 2002/0112156 | A1 | 8/2002 | Gien et al. |
| 2002/0124172 | A1 | 9/2002 | Manahan |
| 2002/0128940 | A1 | 9/2002 | Orrin et al. |
| 2002/0129248 | A1 | 9/2002 | Wheeler et al. |
| 2004/0111379 | A1* | 6/2004 | Hicks et al. ............ 705/76 |
| 2004/0187031 | A1 | 9/2004 | Liddle |
| 2005/0114666 | A1 | 5/2005 | Sudia |
| 2005/0132229 | A1 | 6/2005 | Zhang et al. |
| 2006/0004670 | A1 | 1/2006 | McKenney et al. |
| 2007/0073621 | A1 | 3/2007 | Dulin et al. |
| 2008/0010665 | A1 | 1/2008 | Hinton et al. |

FOREIGN PATENT DOCUMENTS

| | | | |
|---|---|---|---|
| WO | WO 98/26386 A1 | 6/1998 | |
| WO | 98/26385 A3 | 8/1998 | |
| WO | WO 99/22291 | 5/1999 | |
| WO | WO 00/45564 | 8/2000 | |
| WO | WO 00/67143 | 11/2000 | |
| WO | WO 01/18717 A1 | 3/2001 | |

OTHER PUBLICATIONS

"Acceptance of Signature Guarantees From Eligible Guarantor Institutions", 56 Fed. Reg. 18380, (Apr. 22, 1991).
"Acceptance of Signature Guarantees From Eligible Guarantor Institutions", 56 Fed. Reg. 46748, (Sep. 16, 1991) (to be codified at 17 Cfr pt. 240).
Aiken, Peter et al., Microsoft Computer Dictionary, Microsft Press, 5th Edition, p. 290, Jan. 2002.
Aslam, Taimur, Protocols for e-commerce: including related article on BlueMoney commerce model, Dr. Dobb's Journal, Dec. 1998.
"Baltimore Announces Support for IdentruS, the Global Trust Organization", *Business Wire*, New York: Apr. 12, 1999, p. 1, Proquest #40459204, 3 pages.
Banking Bulletin from Christopher M. Cross, Deputy Comptroller for Compliance, Comptroller of the Currency Administrator of National Banks, to national Banks Registered as a Transfer Agent, District Deputy Comptrollers, Department and Division Heads, and all Examining Personnel, Re: Adoption of New Transfer Agent (Feb. 12, 1992).
Biddle, C. Bradford, "Comment, Misplaced Priorities: The Utah Digital Signature Act and Liability Allocation in a Public Key Infrastructure", San Diego Law Review 33, 1143, 1996.
Breed on, Diehard C., Chairman, U.S. Securities and Exchange Commission, Letter to The Honorable Jake Gam, Senate Banking, Housing, and Urban Affairs Committee (Mar. 6, 1990).
Brown-Humes, Christopher, and Graham, George, "Banks join forces to provide guarantees on internet trading", Financial Times, London, UK: Apr. 12, 1999, p. 20, Proquest #40448447, 3 pages.
Brown, Mark R., "Special Edition Using Netscape 2" 1995. 2nd Edition, p. 287,288, 876-879.
Elley, Yassir et al., "Building Certification Paths: Forward vs. Reverse", Proc. 2001 Network and Distributed System Security Symposium, Feb. 8-9, 2001, San Diego, CA.
"Entrust Technologies Supports Newly Formed Identrus Organization", *Business Wire*, New York: Apr. 12, 1999, p. 1, Proquest #40463049, 3 pages.
Guttman, Egon, Professor of Law, The American University, Washington College of Law, letter to Jonathan G. Katz, Esq., Secretary to the Securities and Exchange Commission, Re: Securities Exchange Act Release No. 34-29663 Notice of Proposed Rule Making, new Rule 17 Ad-15 File No. 57-27-91 (Oct. 28, 1991).
Hallerman, David, "Will Banks Become E-Commerce Authorities?", *Bank Technology News*, New York: Jun. 1999, vol. 12, Issue 6, p. 1; Proquest 42664468, 8 pages.

Hesse, Peter & David P. Lemire, "Managing Interoperability in Non-Hierarchical Public Key Infrastructures", Proc. 2001 Network and Distributed System Security Symposium, Feb. 8-9, 2001, San Diego, CA.
"Identrus begins pilot, Bits Opens Doors to Lab", *Corporate EFT Report*, Potomac, Jul. 21, 1999, vol. 19, Issue 14;p. 1; Proquest #43335701, 2 pages.
Jueneman, Robert R., of GTE laboratories, "E-mail to Mike Roe and Warwick Ford, re: User Key Material Proposal", Sep. 8, 1994, 5:49 EDT) (ftp://ftp.tis.com/pub/pem-dev/archive).
Jueneman, Robert R., of GTE laboratories, "E-mail to Phill Hallam, W3C, re: Nonrepudiation and CA Liabilities", Oct. 16, 1995, 15:54 EDT) (ftp://ftp.tis.com/pub/pem-dev/archive).
Jueneman, Robert R., of GTE laboratories, "E-mail to Hal Finney, re: Nonrepudiation and CA liabilities", Oct. 19, 1995, 15:31 EDT) (ftp://ftp.tis.com/pub/pem-dev/archive).
Kutler, Jeffrey, "ABA's Certificate Ventdre Aims to Give Banks the Lead in Secure Net Payments," American Banker, New York, NY: May 14, 1999, vol. 164, Issue 92; p. 1; Proquest #41354786, 3 pages.
Marketing Brochure, Securities Transfer Agent Medallion Program (1991).
Merrill, Charles R., "An Attorney's Roadmap to the Digital Signature Guideline", in 1318 Lecture Notes in Computer Science 291, 291-297 (Rafael Hirschfield ed. 1997).
Mitchell, C.J. et al., *Contemporary Cryptology: The Science of Information Integrity* pp. 325-378 (Simons ed., IEEE Press, 1992).
Pamatatau, Richard, "CA anticipates a secure e-commerce infrastructure", *Dominion*, Wellington, New Zealand, Jul. 26, 1999, P.IT. 8, Proquest #43762280, 3 pages.
Pfitzmann, Birgit, "Digital Signatures Schemes", 1100 Lecture Notes in Computer Science (Goss et al. eds. 1996).
SET: Secure Electronic Transaction Specification—Book 2: Programmer's Guide, May 31, 1997, Version 1, pp. 1-619.
Schapiro, Mary L., "Clarifying Elimination of Stock Certificates", *Wall Street Journal*, Jan. 17, 1991.
Solomon, Howard, "Canadian banks vault into e-com identity service", *Computing Canada*, Jun. 4, 1999, v25i22p. 23; Proquest #42244579, 3 pgs.
STAMP Initiative Receives Support from SEC, STA Newsletter (The Securities Transfer Association, Inc.), Jun. 30, 1990, at 1, 4.
"ValiCert Selected as Validation Technology for Identrus' Global Business to Business E-Commerce Pilot", *PR Newswire*, New York: Jul. 12, 1999, p. 1; Proquest #43079343, 3 pages.
Patent Cooperation Treaty, "PCT International Search Report", issued for PCT/US00/24661, mailed Jan. 25, 2001.
Patent Cooperation Treaty, "PCT International Search Report", issued for PCT/US00/24607, mailed Jan. 9, 2001.
Patent Cooperation Treaty, "PCT International Search Report", issued for PCT/US02/12947, mailed Jun. 21, 2002.
Patent Cooperation Treaty, "PCT International Search Report", issued for PCT/US01/25389, mailed Nov. 23, 2001.
Patent Cooperation Treaty, "PCT International Search Report", issued for PCT/US01/28275, mailed Dec. 31, 2001.
Patent Cooperation Treaty, "PCT International Search Report", issued for PCT/US01/28277, mailed Dec. 14 2001.
Patent Cooperation Treaty, "PCT International Search Report", issued for PCT/US01/28278, mailed Dec. 3, 2001.
Patent Cooperation Treaty, "PCT International Search Report", issued for PCT/US00/24662, mailed Jan. 23, 2001.
Patent Cooperation Treaty; "PCT International Search Report", issued for PCT/US00/24663, mailed Dec. 29, 2000.
Patent Cooperation Treaty, "PCT International Search Report", issued for PCT/US01/25388, mailed Nov. 19, 2001.
Patent Cooperation Treaty, "PCT International Search Report", issued for PCT/US00/03552, mailed Jun. 13, 2000.
Patent Cooperation Treaty, "PCT International Search Report", issued for PCT/US00/03550, mailed May 2, 2000.
Patent Cooperation Treaty, "PCT International Search Report", issued for PCT/US00/24606, mailed Jan. 17, 2001.

(56) References Cited

OTHER PUBLICATIONS

Patent Cooperation Treaty, "PCT International Search Report", issued for PCT/US00/24608, mailed Dec. 8, 2000.
Patent Cooperation Treaty, "PCT International Search Report", issued for PCT/US09/00357, mailed Mar. 24, 2009.
European Patent Office, Supplementary European Search Report for EP 00961672, Munich Germany, Jun. 12, 2009.
Sugiyama, "Investigation in the USA on Authentication Business in Financial Institution", The Center for Financial Industry Information Systems (FISC), No. 205, pp. 50-62, Sep. 1, 1998.
Japanese Patent Office, Office Action issued in Patent Application JP 2001-526778, on Feb. 10, 2010.
Hallam-Baker, "Micro Payment Transfer Protocol (MPTP) Version. 0.1", W3C Working draft, downloaded from http://www.w3.org/pub/WWW/TR/WD-mptp-951122, Nov. 22, 1995, USA.
Kaner, "The Insecurity of the Digital Signature", downloaded from http://www.badsoftware.com/digsig.htm, Sep. 1997, Melbourne, FLA.
Linehan et al., Internet Keyed Payments Protocol (iKP), downloaded from http://www.zurich.ibm./security/past-projects/ecommerce/draft-tsudik-idp-oo.txt, Jul. 1995, Rüschlikon, Switzerland.
MasterCard Int'l Inc. Operations Manual §§ 5.11-5.14 , Nov. 1993, USA.
E-mail from Robert R. Jueneman of GTE Laboratories to Peter Williams of VeriSign, re: Certificate hierarchies and SEPP/STT concepts, part 2, downloaded from http://www.mhonarc.org/archive/html/pem-dev/1995-10/msg00070.html, Oct. 13, 1995, USA.
ARIN—Certificate Authority, downloaded from https://ca.arin.net/pub/arin_ca_request.html sometime before Feb. 23, 2006, Chantilly, VA.

* cited by examiner

PROVISION OF AUTHORIZATION AND OTHER SERVICES

RELATED APPLICATIONS

This patent application is a continuation of U.S. patent application Ser. No. 09/950,059, filed Sep. 10, 2001, now U.S. Pat. No. 7,072,870, which patent application claims priority upon U.S. provisional patent application Ser. No. 60/231,313, filed Sep. 8, 2000, entitled Authorization/Credential Service and Authorization/Credential Service Proposal, U.S. provisional patent application Ser. No. 60/231,315, filed Sep. 8, 2000, entitled Authorization/Credential Service Proposal, and U.S. provisional patent application Ser. No. 60/231,318, filed Sep. 8, 2000, entitled Authorization/Credential Service, all four of which patent applications are hereby incorporated by reference in their entireties into the present patent application.

BACKGROUND OF THE INVENTION

The world of electronic commerce has created new challenges to establishing relationships between contracting parties. One of those challenges springs from the fact that the parties to the transaction cannot see or hear each other, and cannot otherwise easily confirm each other's identity and authority to act.

One remedy for this problem is to provide each contracting party with a private key for signing transmitted messages. The signing party makes available an associated public key that decrypts messages signed with the party's private key, and thus enables a receiving party to confirm the identity of the sender.

But the sender's public key may not be known a priori to the recipient. In that event, the sender may transmit with its signed message a digital certificate issued by a certification authority. The certificate is itself a signed electronic document (signed with the private key of the certification authority) certifying that a particular public key is the public key of the sender.

In some cases, the recipient may be unfamiliar with the public key of the certification authority or may not know whether the certificate is still valid. In that event, the recipient may wish to check the validity of the certificate. In addition, the recipient may wish to check whether or not the sender is authorized to sign the transmitted message.

DISCLOSURE OF INVENTION

Methods, apparati, and computer-readable media for providing authorization and other services. In a preferred embodiment, these services are provided within the context of a four-corner trust model. The four-corner model preferably comprises a subscribing customer (sometimes referred to as the "buyer") and a relying customer (sometimes referred to as the "seller"), who engage in an on-line transaction.

In a preferred embodiment, the subscribing customer is a customer of a first financial institution, referred to as an issuing participant. The issuing participant acts as a certification authority for the subscribing customer and issues the subscribing customer a hardware token including a private key and a digital certificate signed by the issuing participant.

In a preferred embodiment, the relying customer is a customer of a second financial institution, referred to as the relying participant. The relying participant acts as a certification authority for the relying customer and issues the relying customer a hardware token including a private key and a digital certificate signed by the relying participant. The system also includes a root entity that maintains a root certification authority that issues digital certificates to the issuing and relying participants.

The present system provides a generalized framework for designing and implementing one or more authorization services that may be used to confirm the authority of an individual to act on behalf of a customer. Such authorization services may be used, for example, to determine whether a particular employee is authorized to purchase certain goods, negotiate a particular contract, or undertake to perform in a particular manner on behalf of its employer.

In a preferred embodiment, authorization services in the present system may be designed and implemented in accordance with the following process. First, a customer and its participant work together to define a desired authorization service. The authorization-service definition preferably includes both a messaging specification for the service and a set of rules that govern its use, as described in more detail below.

Second, the proposed authorization service is presented to a policy management authority maintained by the root entity for approval. The policy management authority reviews the proposed authorization service for compliance with system operating rules and specifications promulgated by the root entity.

Third, if the proposed authorization service is approved by the root-entity policy management authority, the service is implemented within the four-corner model.

When a relying customer wishes to utilize an approved authorization service, it prepares an authorization request that complies with the service's messaging specification and transmits the request to its relying participant.

The relying participant transmits the request to the issuing participant which processes the request in accordance with authorization information provided by the subscribing customer as well as any implementation rules that have been specified for the service. The issuing participant then prepares an authorization response that complies with the service's messaging specification and transmits the response to the relying participant. The relying participant transmits the authorization response to its relying customer.

The features and advantages described in the specification are not all inclusive, and many additional features and advantages will be apparent to one of ordinary skill in the art in view of the drawings, specification, and claims hereof.

BRIEF DESCRIPTION OF THE DRAWINGS

The above summary of the invention will be better understood when taken in conjunction with the following detailed description and accompanying drawings, in which.

DETAILED DESCRIPTION OF THE PREFERRED EMBODIMENTS

The present disclosure relates to a system and method for providing authorization and other services. In a preferred embodiment, these services are provided within the context of a four-corner trust model. A preferred embodiment of a four-corner model suitable for use in the present system is shown in FIG. 1.

Figure 1:
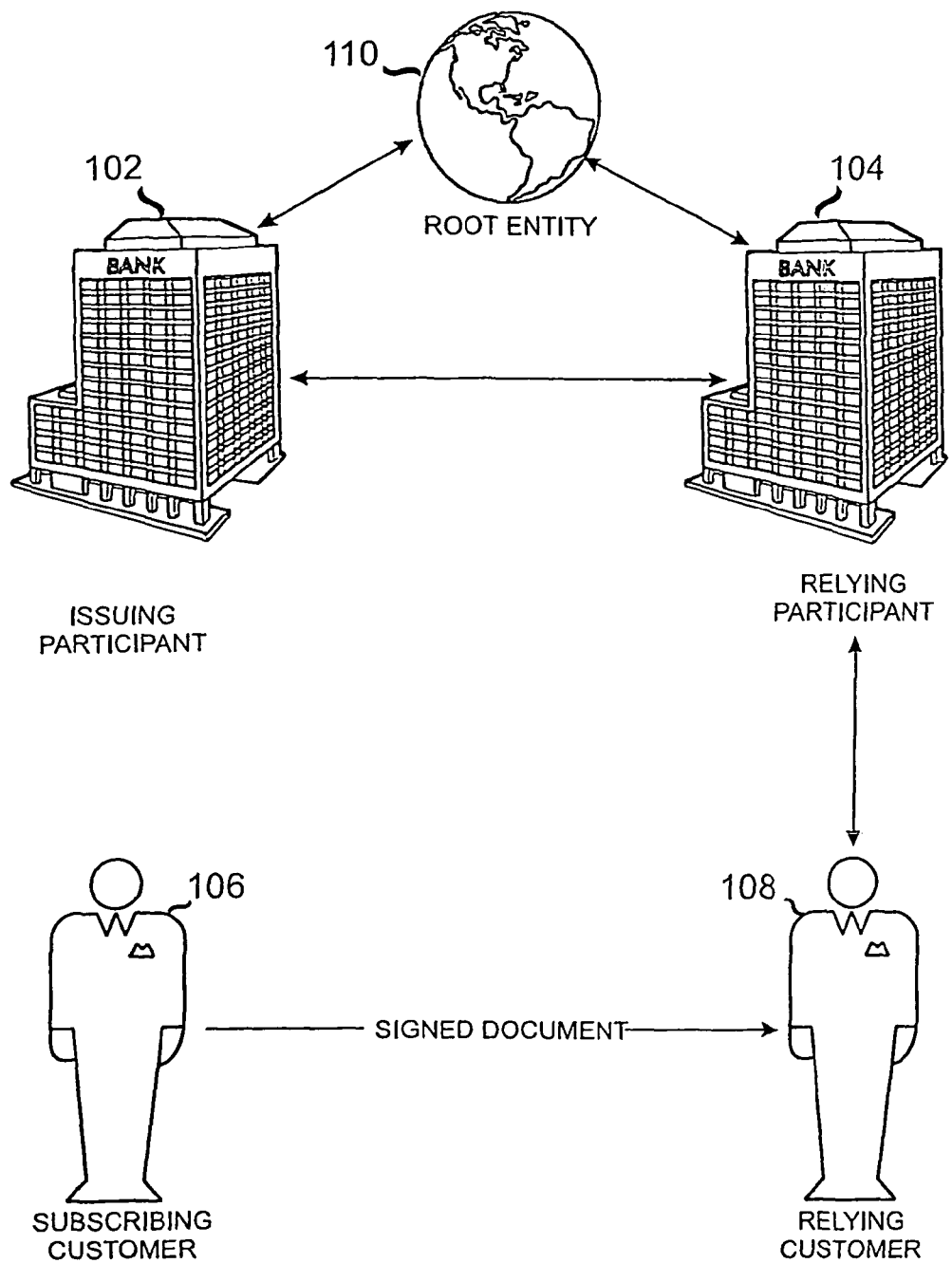
FIG. 1 is a block diagram of a preferred embodiment of a four-corner model suitable for use in the present system.

As shown in FIG. 1, the four-corner model preferably comprises a first institution 102 and a second institution 104. First institution 102 is referred to as the "issuing participant" because it is a participant in the present system and issues to its customers tokens that include a private key and a digital certificate signed by the issuing participant, as described below. Second institution 104 is referred to as the "relying participant" because it is a participant in the present system and its customers rely on representations made by issuing participant 102 and issuing participant 102's customers, as described below. Participants 102, 104 may preferably be banks or other financial institutions.

Also shown in FIG. 1 are a first customer 106 and a second customer 108. First customer 106 and second customer 108 are preferably customers of issuing participant 102 and relying participant 104, respectively. First customer 106 is referred to as the "subscribing customer" because this customer subscribes to services provided by issuing participant 102. First customer 106 is also sometimes referred to as the "buyer" because it typically fills that role in transactions with second customer 108, as described below.

Second customer 108 is referred to as the "relying customer" because it relies on representations made by both issuing participant 102 and subscribing customer 106. Second customer 108 is also sometimes referred to as the "seller" because it typically fills that role in transactions with first customer 106, as described below. It should be recognized, however, that although the description below speaks primarily in terms of a buyer 106 and a seller 108, first customer 106 and second customer 108 may instead have different roles in a given transaction. For example, first customer 106 may be a borrower repaying a loan to second customer 108.

As will be recognized, although the preferred embodiments described below speak primarily in terms of customer 106 acting as a subscribing customer and customer 108 acting as a relying customer, the roles of these two customers may at times be reversed, even within a single transaction and with respect to a single document. For example, in connection with a particular transaction, customers 106, 108 may prepare a contract to be signed by both parties. With respect to customer 106's signature on the contract, customer 106 is the subscribing customer and customer 108 is the relying customer. By contrast, with respect to customer 108's signature on the contract, customer 108 is the subscribing customer and customer 106 is the relying customer.

It should also be noted that each customer 106, 108, may be a business entity, such as a corporation, that employs many individuals. In such cases, customers 106, 108 preferably authorize some or all of these individual employees to transact and utilize system services on their behalf. Issuing participant 102 preferably issues a separate smartcard token having a distinct private key and associated digital certificate to each authorized employee of subscribing customer 106. Similarly, relying participant 104 (in its capacity as "issuing participant" to relying customer 108) preferably issues a separate smartcard token having a distinct private key and associated digital certificate to each authorized employee of relying customer 108. The digital certificates preferably include the individual employee's name and identify the customer for whom he or she works. In an alternative embodiment, the private key may instead be included in a software token provided to the individual.

It should be recognized that although the description that follows may speak in terms of messages or other data being signed by a "subscribing customer" or "relying customer," the signature may in fact typically be created by an individual employee using his or her digital certificate and associated private key acting on behalf of his or her employer.

Also shown in FIG. 1 is a root entity 110. Root entity 110 is preferably an organization that establishes and enforces a common set of operating rules for facilitating electronic commerce and electronic communications. Root entity 110 may be owned jointly by a plurality of banks and/or other financial institutions that have agreed to adhere to these operating rules. One exemplary embodiment of such a root entity is described in copending U.S. application Ser. No. 09/502,450, filed Feb. 11, 2000, entitled System and Method for Providing Certification Related and Other Services and in copending U.S. application Ser. No. 09/657,623, filed Sep. 8, 2000, entitled System and Method for Providing Certificate-Related and Other Services, which are hereby incorporated by reference.

Figure 2:
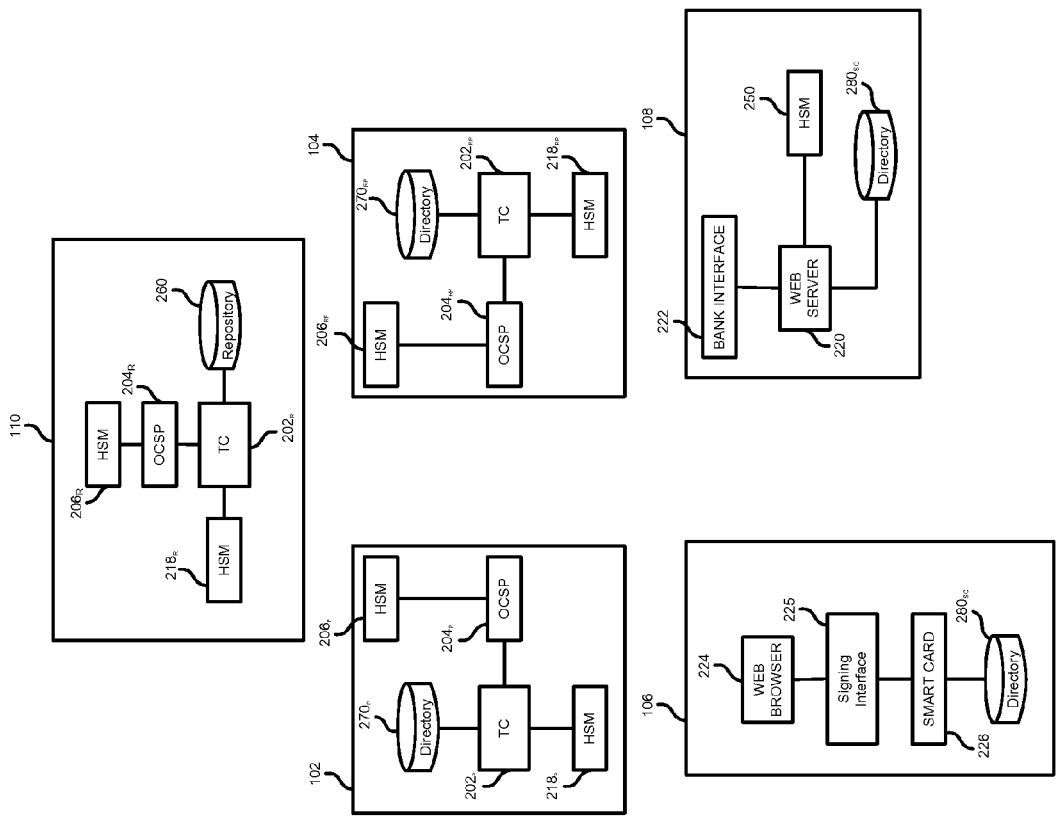
FIG. 2 is a block diagram of a preferred embodiment showing components provided at entities in the present system.
Figure 3A:
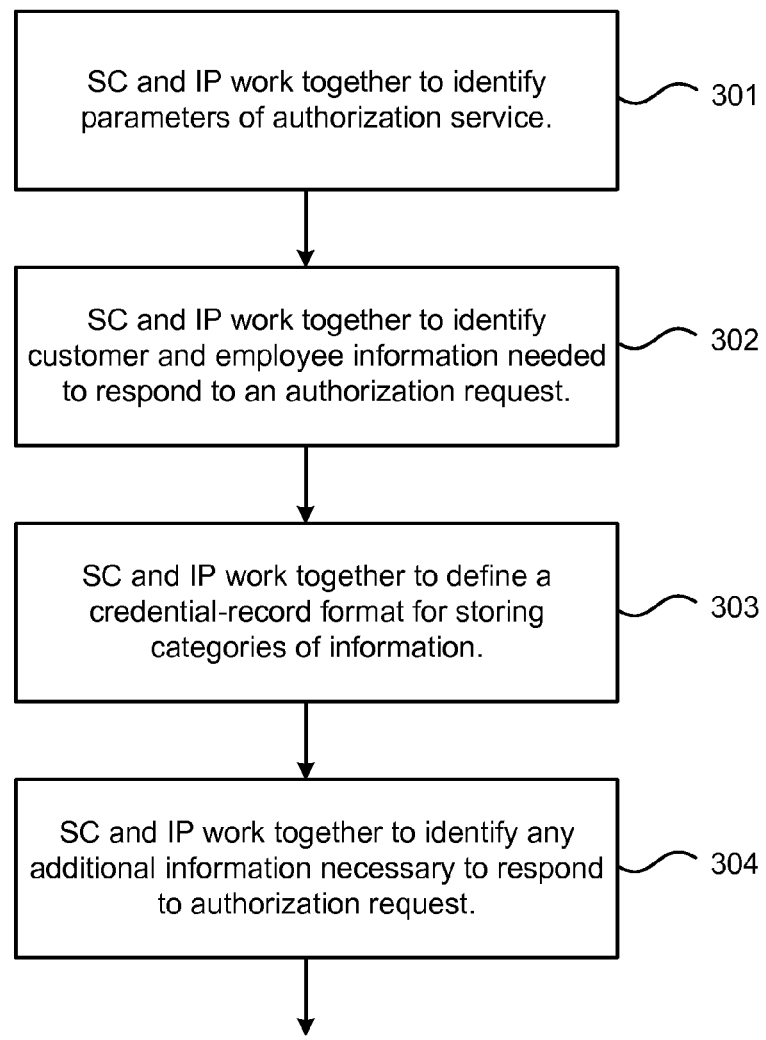
FIG. 3 illustrates a preferred embodiment for establishing an authorization service.
Figure 3B:
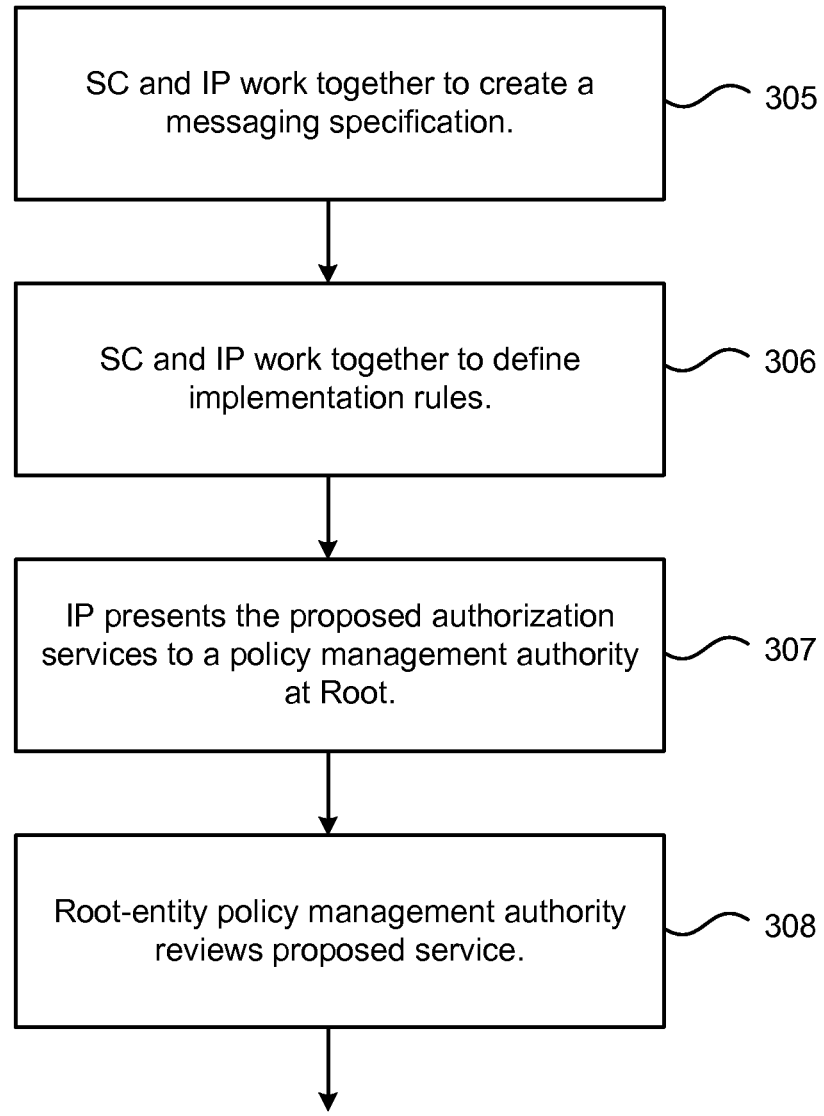
Figure 3C:
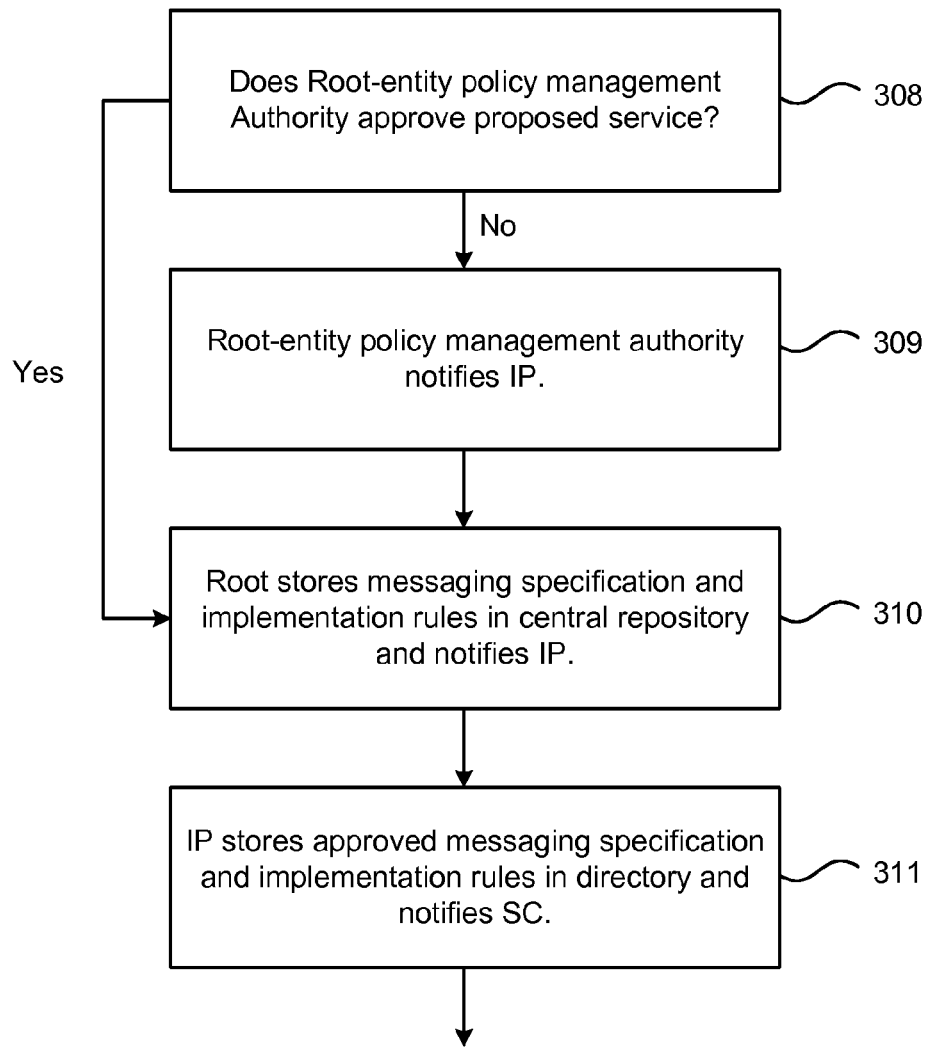
Figure 3D:
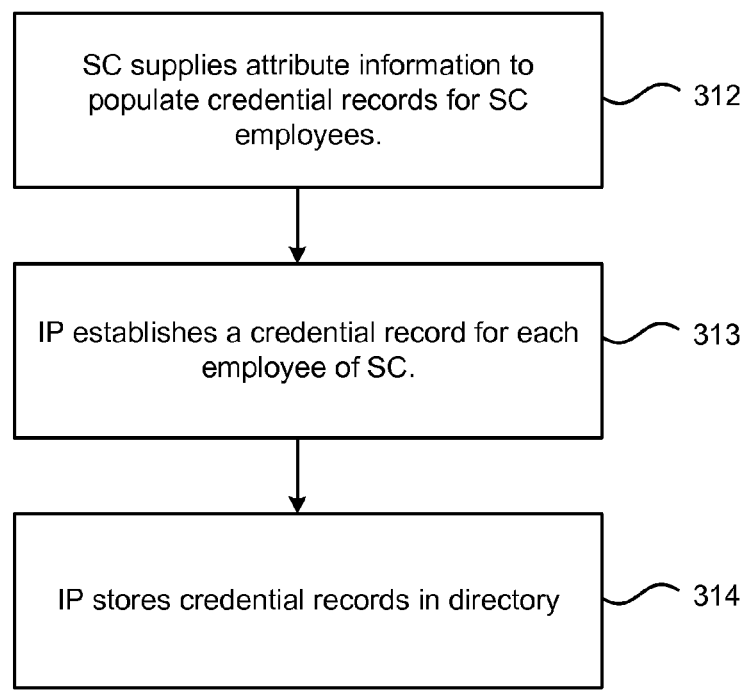
Figure 4A:
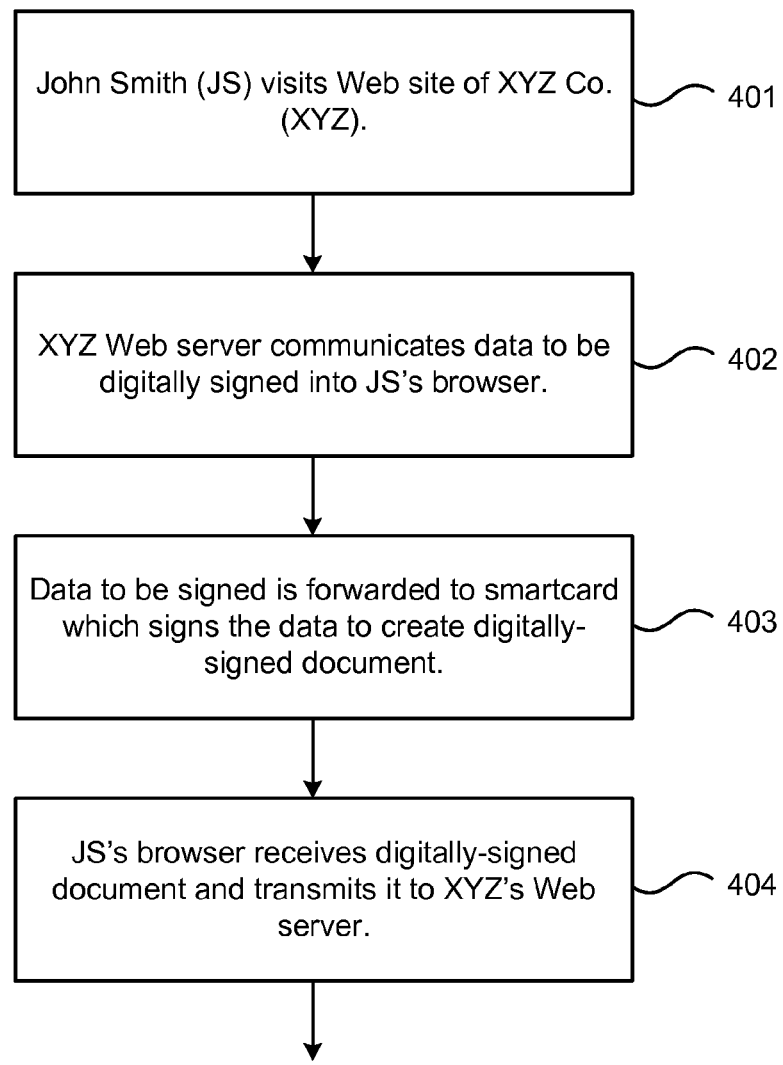
FIG. 4 illustrates a preferred embodiment of a process flow for using an authorization service.
Figure 4B:
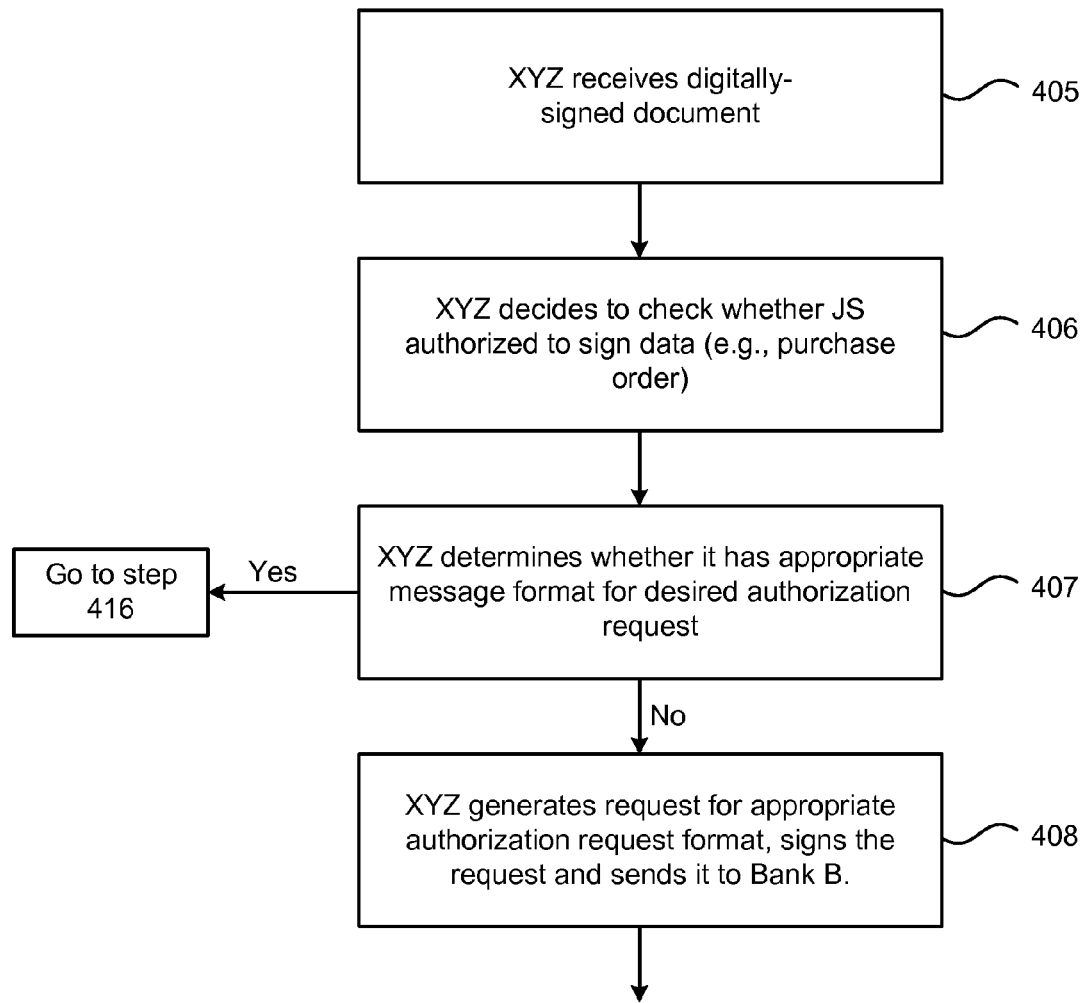
Figure 4C:
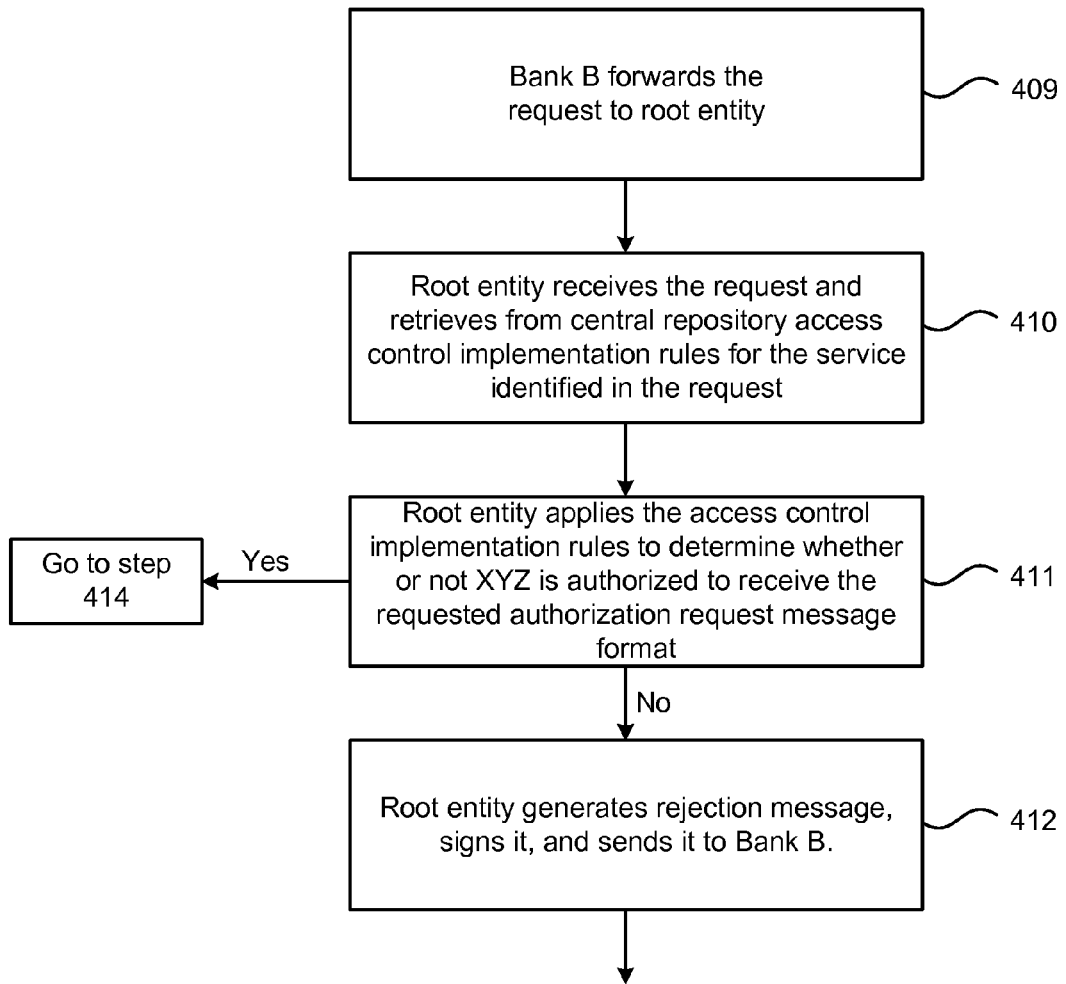
Figure 4D:
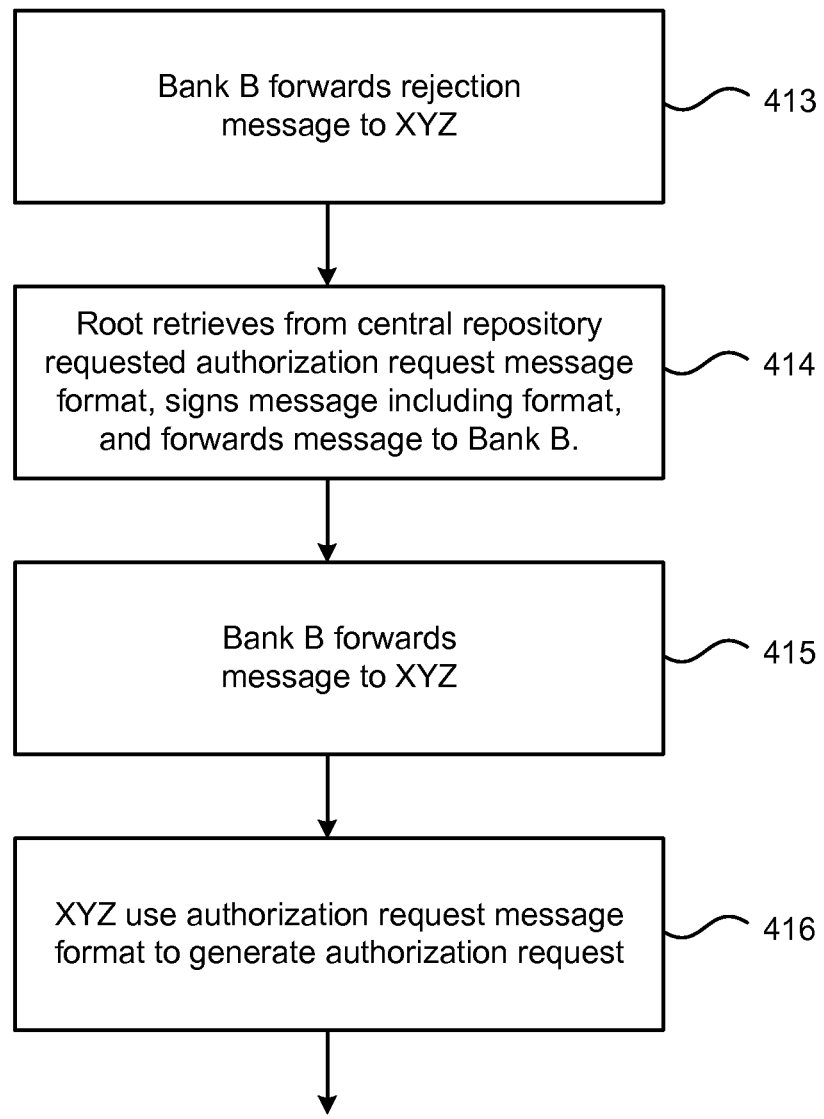
Figure 4E:
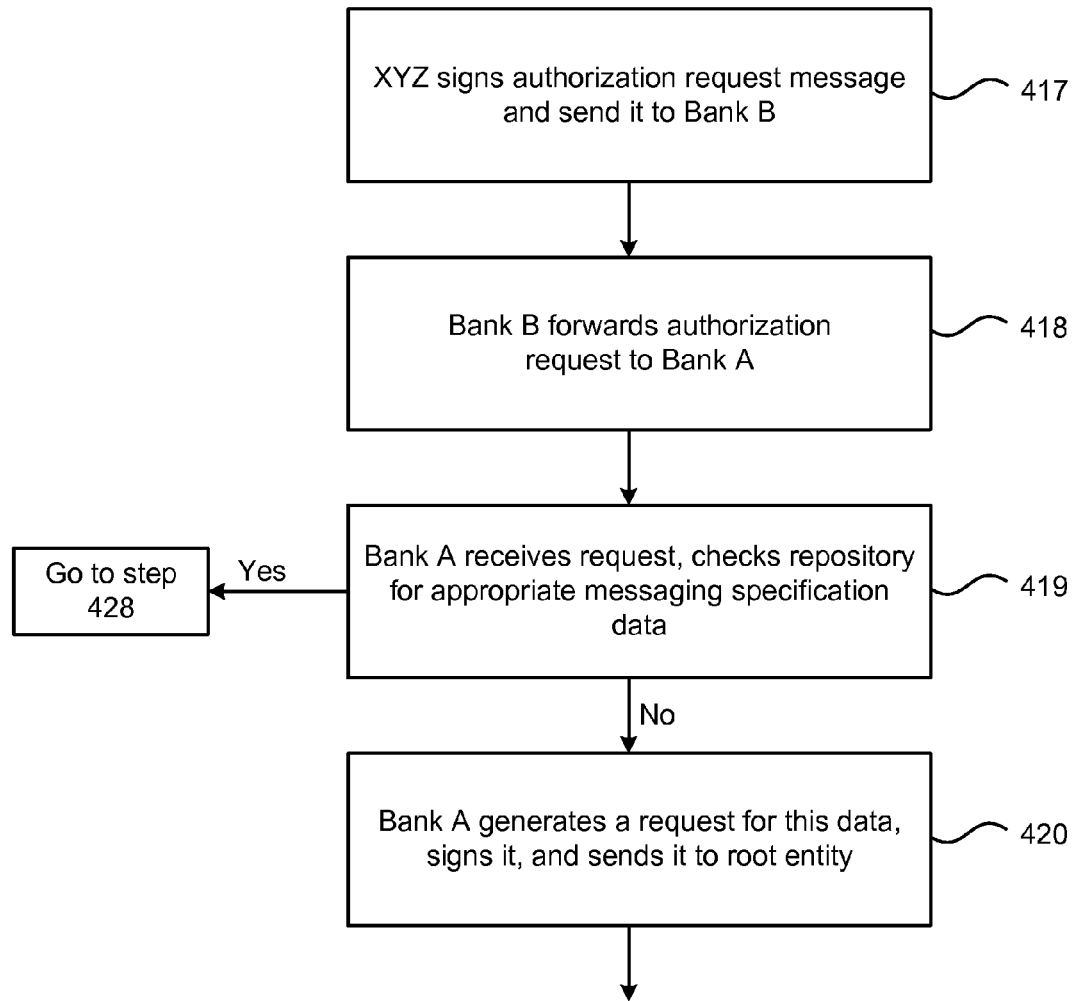
Figure 4F:
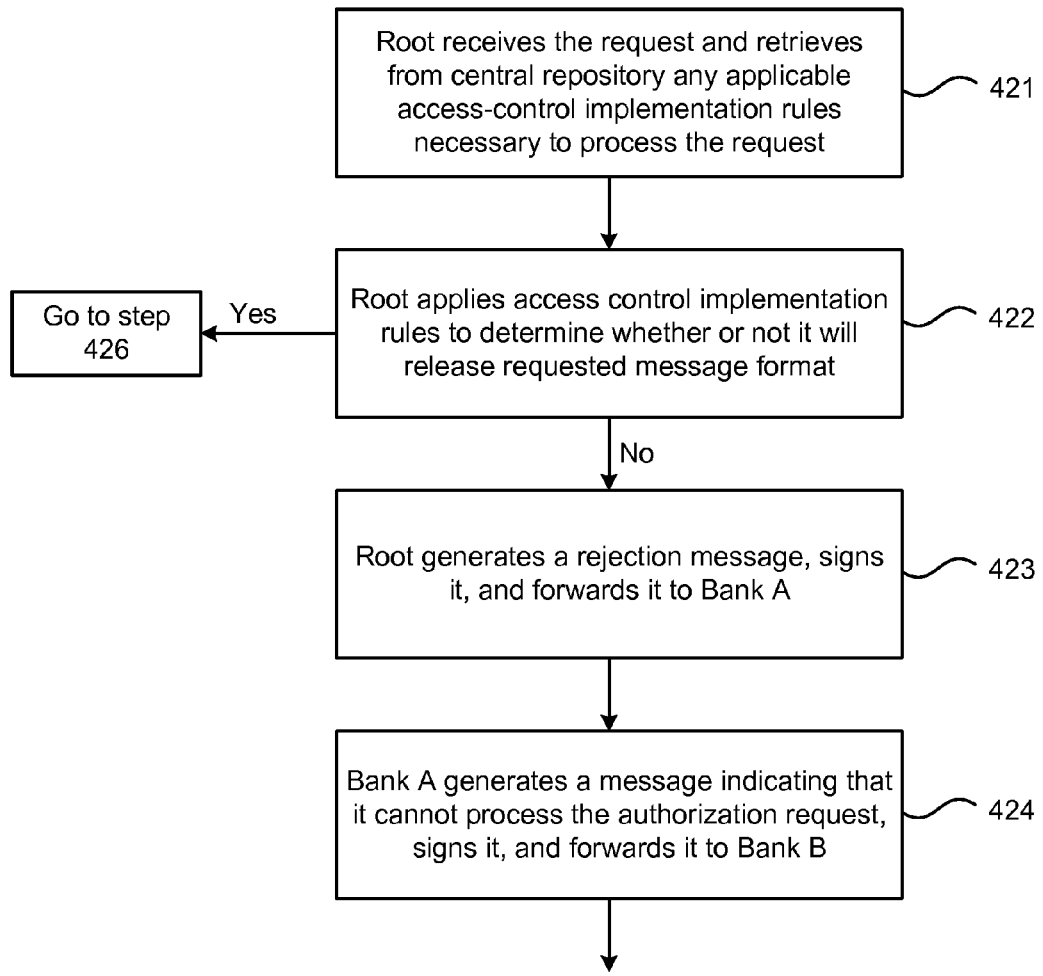
Figure 4G:
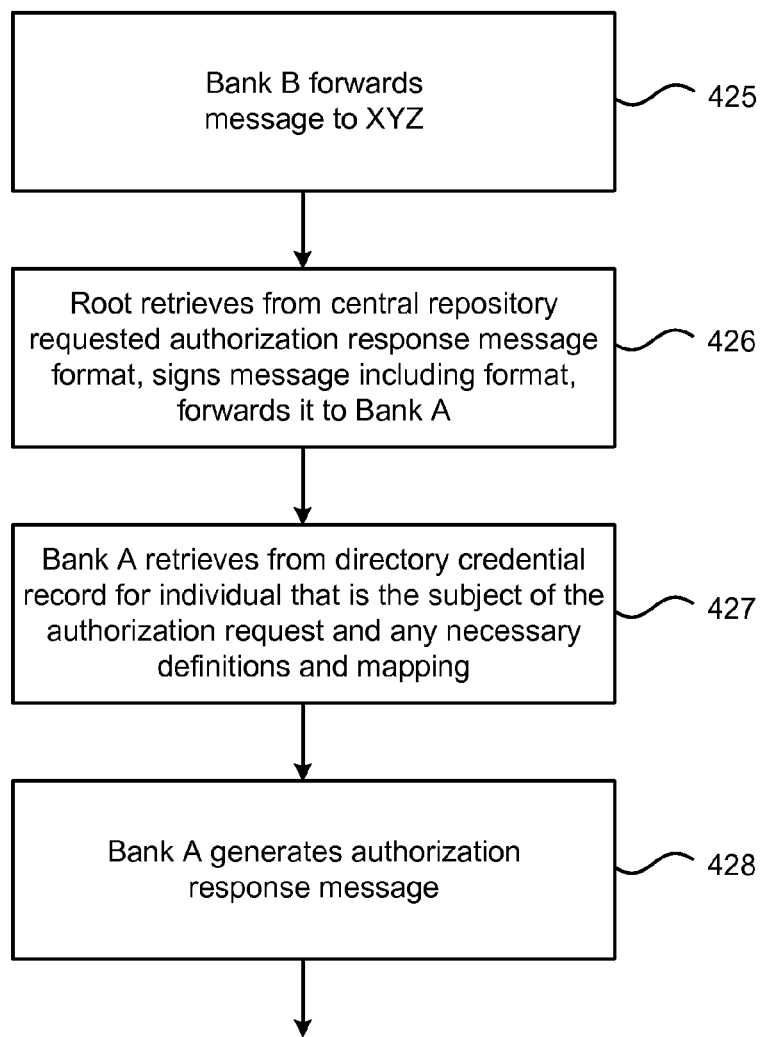
Figure 4H:
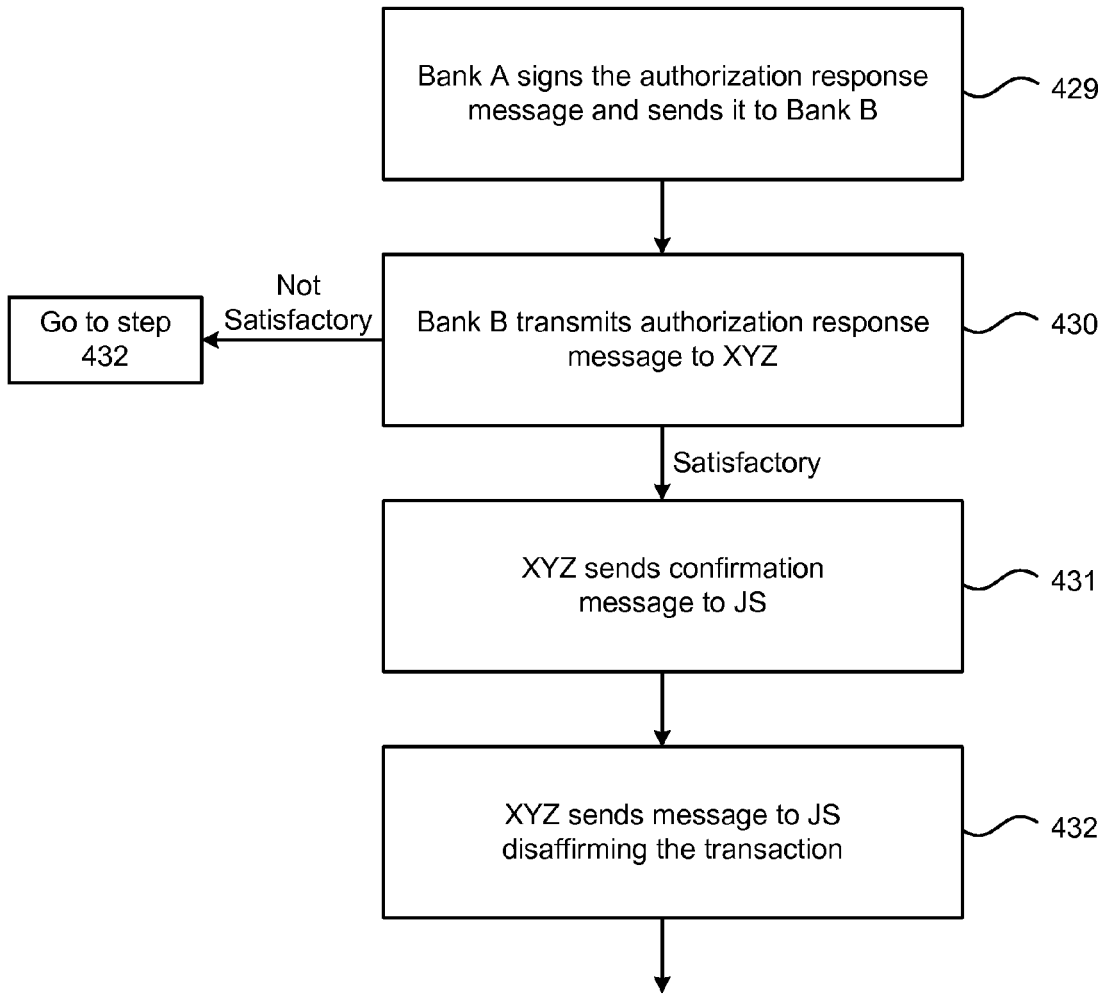

FIG. 2 is a block diagram of a preferred embodiment showing components provided at each entity in the present system. As shown in FIG. 2, participants 102, 104, and root entity 110 are each preferably provided with a transaction coordinator 202 that serves as a gateway for transmitting and receiving all inter-entity messages related to services provided by the present system. Transaction coordinators 202 provide a single interface to issuing participant 102's and relying participant 104's on-line services and implement safeguards necessary to ensure secure electronic communications between transaction coordinators 202 and other entities in the four-corner model, as described in copending U.S. application Ser. No. 09/657,605, filed on Sep. 8, 2000, entitled System and Method for Providing Certificate Validation and Other Services, which is hereby incorporated by reference. Each transaction coordinator 202 is preferably provided with an associated hardware security module (HSM) 218 for signing and verifying messages. Participants 102, 104, and root entity 110 are each further preferably provided with an OCSP responder 204 and associated hardware security module (HSM) 206 for signing and verifying signatures on messages.

Root entity 110 is also preferably provided with a central repository 260. Central repository 260 is preferably adapted to store data, such as, for example, messaging specification and other data as described in more detail below.

Participants 102 and 104 are each preferably provided with a directory 270. Directory 270 is preferably adapted to store data, such as, for example, credential records and messaging specification data, as described in more detail below.

Subscribing customer 106 is preferably provided with a Web browser 224 adapted to receive and transmit information via the Internet. Subscribing customer 106 is also preferably provided with a smartcard subsystem 226 adapted to sign electronic messages. In a preferred embodiment, smartcard subsystem 226 may include a smartcard reader, a smartcard driver, a smartcard token, and other software, as described in U.S. provisional application Ser. No. 60/224,994, filed Aug. 14, 2000, entitled Signing Interface Requirements, Smart Card Compliance Requirements, Warranty Service Functional Requirements, and Additional Disclosure and copending U.S. application Ser. No. 09/928,999, filed Aug. 14, 2001, entitled System and Method for Secure Smartcard Issuance, which are hereby incorporated by reference. In a preferred embodiment, the smartcard token is issued to subscribing customer 106 by its issuing participant 102.

Subscribing customer 106 is also preferably provided with a signing interface 225. Signing interface 225 is adapted to invoke smartcard 226 to execute a digital signature, as described in U.S. provisional application Ser. No. 60/224, 994, filed Aug. 14, 2000, entitled Signing Interface Requirements, Smart Card Compliance Requirements, Warranty Service Functional Requirements, and Additional Disclosure and U.S. application Ser. No. 09/929,035, filed Aug. 14, 2001, entitled System and Method for Facilitating Signing by Buyers in Electronic Commerce, which are hereby incorporated by reference.

Relying customer 108 is preferably provided with a Web server 220 adapted to receive and transmit information via the Internet and a bank interface 222 for accessing system services. An exemplary bank interface is described in copending U.S. application Ser. No. 09/657,604, filed on Sep. 8, 2000, entitled System and Method for Facilitating Access by Sellers to Certificate-Related and Other Services, which is hereby incorporated by reference. Relying customer 108 is preferably further provided with an HSM 250 for signing and verifying signatures on messages.

Customers 106, 108 are also each preferably provided with a directory 280 that is adapted to store data, such as, for example, credential records and messaging specification data, as described in more detail below.

In a preferred embodiment, each system entity is further preferably provided with two digital certificates (and corresponding private keys) to facilitate authentication: an identity certificate and a utility certificate.

The identity private key is used to produce digital signatures that are required by root entity 110 as evidence of an entity's contractual commitment to the contents of an electronic transaction, such as a purchase order.

The utility private key is used to provide additional transactional security. Typically, utility certificates are used to support secure socket layers (SSL), to sign secure multipurpose internet mail extension (S/MIME) messages, and for other utility applications. Any reference in this document to the term "certificate" refers to an identity certificate unless otherwise stated.

In a preferred embodiment, root entity 110, in its capacity as a certification authority, uses a root private key to create the digital certificates of each system participant (e.g., issuing participant 102 and relying participant 104). In addition, it uses the root private key to create digital certificates for each system component maintained by root entity 110 that has digital signing capability, including OCSP responder $204_R$ and transaction coordinator $202_R$.

In addition, each system participant (e.g., issuing participant 102 and relying participant 104), in its capacity as a certification authority, uses the private key associated with its certificate from root entity 110 to create the digital certificates of its customers (e.g., subscribing customer 106 and relying customer 108). In addition, it uses this private key to create digital certificates for each system component that it maintains that has digital signing capability, including its OCSP responder 204 and transaction coordinator 202. In an alternative embodiment, the digital certificates for system components with digital signing capability that are maintained by a participant may be issued by root entity 110.

It should be noted that the system entities may each be provided with additional components not shown in FIG. 2, such as the components described in copending U.S. application Ser. No. 09/657,605, filed on Sep. 8, 2000, entitled System and Method for Providing Certificate Validation and Other Services, U.S. provisional application Ser. No. 60/224, 994, filed Aug. 14, 2000, entitled Signing Interface Requirements, Smart Card Compliance Requirements, Warranty Service Functional Requirements, and Additional Disclosure, U.S. provisional application Ser. No. 60/259,796, filed Jan. 4, 2001, entitled Warranty Manager Application Programming Interface, Warranty Messaging Specification, and Warranty Manager Functional Requirements, and copending U.S. application Ser. No. 09/928,998, filed Aug. 14, 2001, entitled System and Method for Providing Warranties in Electronic Commerce.

Overview of Authorization Services

The authorization services described herein provide a mechanism by which a first customer (e.g., customer 108) may confirm the authority of an individual to act on behalf of a second customer (e.g., customer 106). For example, authorization services may be used to confirm the authority of an individual to sign a particular document or to undertake a particular financial or performance obligation on behalf of the second customer. More specifically, authorization services maybe used, to cite just a few specific examples, to determine whether a particular employee is authorized to purchase a particular class of goods, negotiate a particular type of contract, or undertake to perform in a particular manner on behalf of the second customer.

It should be recognized that the present system is intended to support a wide variety of authorization services that are preferably tailored to the business needs of a particular customer or industry. It is therefore impossible to describe completely every possible authorization service that may be supported by the present system. Rather, the description below provides a generalized framework for defining and implementing authorization services in a variety of business settings.

To facilitate understanding of this generalized framework, an exemplary embodiment for defining and implementing a particular authorization service is described below. The exemplary embodiment comprises a hypothetical subscribing customer, ABC Co., that is a customer of an issuing participant, Bank A, and a hypothetical relying customer XYZ Co., that is a customer of a relying participant, Bank B. ABC Co. employs an office manager, known as John Smith, who is authorized to transact on behalf of ABC Co. in particular ways, as described in more detail below.

As noted above, in a preferred embodiment, authorization services are designed and implemented in the present system using the following steps. First, a customer and its participant work together to define a desired authorization service. The authorization-service definition preferably includes both a messaging specification for the service and a set of rules that govern its use, as described in more detail below.

Second, the proposed authorization service is presented to a policy management authority maintained by root entity 110 for approval. The policy management authority reviews the proposed authorization service for compliance with system operating rules and specifications promulgated by root entity 110.

Third, if the proposed authorization type is approved by the root-entity policy management authority, the service is implemented within the four-corner model.

The first and second steps are described in more detail in connection with FIG. 3 below. The third step is described in more detail in connection with FIGS. 4-7 below.

Establishing an Authorization Service

FIG. 3 illustrates a preferred embodiment for establishing a new authorization service. As shown in FIG. 3, in step 301, subscribing customer 106 and issuing participant 102 work together to broadly identify the parameters of an authorization service to be defined. For example, it may be determined that it would be useful to define an authorization service for ABC Co. to be used in authorizing purchase of goods or services by ABC Co. employees.

In step 302, subscribing customer 106 and issuing participant 102 work together to identify the particular customer and employee information needed to respond appropriately to such an authorization request. For example, it may be determined that each employee of ABC Co. has a title and that the types and amount of goods and services that the employee is authorized to obtain on behalf of ABC Co. are a function of that title. As will be recognized, this information will typically vary significantly from authorization service to authorization service as a function of the customer, industry, or type of authorization desired.

In step 303, subscribing customer 106 and issuing participant 102 work together to define a credential-record format for storing the categories of information (e.g., title, purchasing limit) identified in step 302. This credential-record format is preferably customized as appropriate for the particular customer and industry to which the authorization service pertains.

In a preferred embodiment, each credential record comprises one or more pairs of roles and attributes. A role is a characteristic relevant to the authority of an individual to take a particular action. An attribute represents the particular value assigned to a role for a given individual.

For example, in the exemplary embodiment, it may be determined that each credential record should comprise the following roles:
  (1) Name
  (2) Title
  (3) Purchasing Authority
  (4) Purchasing Limit
An exemplary set of attributes for these roles may be:
  (1) John Smith
  (2) Office Manager
  (3) Office Supplies
  (4) $1,000

In step 304, subscribing customer 106 and issuing participant 102 work together to identify any additional information that may be necessary to properly respond to authorization requests for the authorization type being defined. In a preferred embodiment, this information may include definition information and mapping information.

Definition information is information used to construe particular attributes assigned to one or more employees of subscribing customer 106. For example, as noted above, the purchasing-authority role for ABC Co.'s office manager may be assigned the attribute "Office Supplies." Definition information is preferably used to define the scope of this attribute. For example, definition information may be provided that defines "Office Supplies" as including pens, pencils, paper, adhesive tape, etc., but as excluding (either explicitly or by implication) desks, telephones, photocopy machines, etc. As described below, Bank A may refer to this definition information in responding to authorization requests concerning the purchasing authority of John Smith.

Mapping information is information used to interpret an authorization request received from an entity that uses different terminology than subscribing customer 106 to describe the same things. For example, seller XYZ Co. may be located in the United Kingdom where the term "sellotape" is used to described what ABC Co. (located, for example, in the United States) would refer to as "adhesive tape." Mapping information may be used to translate terms in an authorization request into appropriate terminology that matches that used by ABC Co.

Additional mapping data may also preferably be maintained by issuing participant 102 to allow, for example, for currency conversion. Thus, for example, if seller XYZ Co. is located in the United Kingdom, it may specify a purchase amount in an authorization request in pounds sterling. Bank A may use dynamically-maintained mapping information to translate the purchase amount to dollars if, for example, ABC Co. specified its employee purchasing limits in that currency.

In step 305, issuing participant 102 and subscribing customer 106 preferably work together to create a messaging specification that defines a format for authorization requests and responses to be used in connection with the defined authorization service. As noted, the present system is intended to support a wide variety of authorization services each of which may be defined as desired by issuing participant 102 and subscribing customer 106. Accordingly, in a preferred embodiment, the messaging specification may define messages in any suitable format such as extensible markup language (XML), hypertext markup language (HTML), etc.

For purposes of the exemplary embodiment described herein, it will be assumed that all messages are to be defined in XML format. As such, the messaging specification created by issuing participant 102 and subscribing customer 106 preferably comprises a document type definition (DTD) that provides the formal description of all valid XML authorization request and response messages used in connection with the authorization service being defined. Exemplary embodiments for such authorization request and response messages are described below.

In a preferred embodiment, an authorization service may be designed to support static authorization requests, dynamic authorization requests, or both.

A dynamic authorization request is a request for approval that an individual is authorized to perform a certain act or undertake a particular transaction. For example, a dynamic authorization request may specify that a proposed transaction has a value of $500 and seek to determine whether a particular individual is authorized to transact in that amount. A dynamic authorization response preferably returns a Boolean value (e.g., "Authorized" or "Not Authorized").

A static authorization request is a request for the attribute(s) of one or more roles associated with a particular individual. For example, a static request may seek the signing limit of a particular corporate officer. A static authorization response returns the particular attribute(s) requested.

In step 306, issuing participant 102 and subscribing customer 106 preferably work together in order to define a set of implementation rules that govern use of the authorization service being defined. As noted above, the present system is designed to be flexibly adaptable to the needs of various businesses in various industries. Accordingly, it is impossible to create a complete list of all such rules that might be proposed by a particular subscribing customer 106 and/or issuing participant 102. Illustrative examples of such rules, however, may include the following:

1. Issuing participant 102 may respond to a request for authorization concerning purchase of office supplies only if the request is received from a company that sells office supplies.

2. Issuing participant 102 may respond to a request for authorization concerning purchase of office supplies only if the request is received from a company on a list of approved suppliers established by subscribing customer 106.

3. Issuing participant 102 may respond to a request for authorization concerning purchase of office supplies only if the request is received from a particular company, e.g., XYZ Co.

4. Issuing participant 102 may respond to a request for authorization concerning purchase of office supplies only if the request is received from an individual with a title of "sales manager."

5. Issuing participant 102 may respond to a request for authorization concerning purchase of office supplies only if the request is received from a particular individual employed by XYZ Co., e.g., Jane Doe.

It should be noted that the implementation rules may differ as a function of authorization-request type (i.e., a static vs. dynamic authorization request). In particular, a subscribing customer 106 may wish to establish more restrictive rules for responding to static authorization requests than dynamic information requests.

It should also be noted that it may often be possible to enforce one or more implementation rules by properly defining the messaging specification for the proposed service. For example, a subscribing customer 106 may wish to permit issuing participant 102 to respond to authorization requests only from relying customers 108 that are in possession of a signed purchase order from subscribing customer 106. This implementation rule may be enforced by defining an authorization-request message format that includes a signed-purchase-order field in which relying customer 108 must include a signed purchase order from subscribing customer 106.

In a preferred embodiment, the implementation rules may also define access controls that limit the ability of relying customers to obtain the messaging formats for the proposed service. As will be recognized, the very structure of an authorization-request or authorization-response message, and the fields it comprises, may reveal valuable business information regarding the structure of a business entity. Such message-format data may also provide an attacker with information that might be useful in generating forged authorization requests or responses. Accordingly, in a preferred embodiment, the implementation rules also define access controls that limit access to messaging specification data for the proposed service. For example, access controls may be used to determine whether or not a particular relying customer 108 is entitled to receive the message format for a particular type of authorization request. In a preferred embodiment, these implementation rules are typically enforced by root entity 110 which is responsible for responding to requests for message-format data, as described in more detail below.

In step 307, issuing participant 102 presents the proposed authorization service including its messaging specification and implementation rules to a policy management authority maintained by root entity 110. In step 308, the root-entity policy management authority reviews the proposed service for compliance with system operating rules and specifications promulgated by root entity 110 and determines whether or not to approve the proposed service.

If the root-entity policy management authority does not approve the proposed service, it notifies issuing participant 102 of this fact (step 309). The policy management authority may include with the denial suggested amendments to the messaging specification or implementation rules that would conform the authorization service to the operating rules and specifications promulgated by root entity 110 and permit approval of the proposed service.

If the root-entity policy management authority approves the proposed service, then, in step 310, root entity 110 stores the messaging specification and implementation rules for the service in central repository 260 and notifies issuing participant of the approval.

Once approval notification is received, issuing participant 102 stores the approved messaging specification and implementation rules in directory 270 and notifies subscribing customer 106 of the approval (step 311). In step 312, subscribing customer 106 supplies attribute information to issuing participant 102 to populate credential records for subscribing customer 106's employees. For example, as noted above, ABC Co. may have an employee whose name is John Smith, whose title is "Office Manager" and who is therefore authorized to purchase up to $1000 of office supplies. In the exemplary embodiment, ABC Co. would transmit this attribute information (and analogous information for its other employees) to Bank A.

In step 313, issuing participant 102 establishes a credential record for each employee of subscribing customer 106 identified to it in step 312. In the exemplary embodiment, for example, a credential record for John Smith may appear as follows:

Name=John Smith
Title=Office Manager
Purchasing Authority=Office Supplies
Purchasing Limit=$1,000

In step 314, issuing participant 102 stores the credentials records in directory 270. In a preferred embodiment, this information may also be stored at subscribing customer 106 in directory 280.

The authorization service is now ready for use by system customers, as described in the following section.

Authorization Service Process Flow

A preferred embodiment of a process flow for using an approved authorization service is now described in connection with FIGS. 4-5. It should be recognized that the present system is intended to provide authorization services in a wide variety of situations in which one entity might seek authorization of another to transact or undertake some obligation. It is therefore impossible to describe completely every possible situation in which the authorization services of the present system might be used. The exemplary preferred embodiment described below describes a typical example (purchase of goods by one customer from another) in which authorization of an individual might be sought. It will be recognized, however, that the authorization services of the present system may be used in many other circumstances such as to confirm the authorization of one individual to negotiate a particular contract before commencing negotiations (which may be time-consuming and costly) with that individual.

For purposes of the present exemplary embodiment, it will be assumed that the components shown in FIG. 2 as being associated with the subscribing customer are owned and maintained by ABC Co. and assigned for use to John Smith, its office manager. It will further be assumed that the components shown in FIG. 2 as being associated with the relying customer are owned and maintained by XYZ Co. It will further be assumed that the components shown in FIG. 2 as being associated with the issuing participant and relying participant are owned and maintained by Bank A and Bank B, respectively.

Beginning with FIG. 4, in step 401, John Smith, the office manager for ABC Co., visits the Web site of XYZ Co. using his browser 224. The parties preferably authenticate themselves to each other over an SSL session with their utility keys.

Once John Smith agrees to a transaction (e.g., to purchase $200 of adhesive tape), Web server 220 communicates data to be digitally signed to browser 224 (e.g., a purchase order for the agreed to transaction) (step 402). In step 403, the data to be signed is forwarded to smartcard subsystem 226 which signs the data to create a digitally-signed document.

In step 404, browser 224 receives the digitally-signed document and transmits it to Web server 220 or another appropriate location specified by XYZ Co. In a preferred embodiment, this signing process may be facilitated by using a signing interface 225 to invoke smartcard subsystem 226, as described in U.S. provisional application Ser. No. 60/224,994, filed Sep. 8, 2000, entitled Signing Interface Requirements, Smart Card Compliance Requirements, Warranty Service Functional Requirements, and Additional Disclosure and copending U.S. application Ser. No. 09/929,035, filed Aug. 14, 2001, entitled System and Method for Facilitating Signing by Buyer's in Electronic Commerce, which are hereby incorporated by reference.

In step 405, XYZ Co. receives the digitally-signed document. In step 406, XYZ Co. decides to confirm that John Smith is authorized to sign the purchase order.

In step 407, XYZ Co. determines whether it has previously obtained the appropriate message format for the desired authorization request to be created. As noted, the desired authorization request may be a static authorization request or a dynamic authorization request depending on the type of information that XYZ Co. would like to obtain. If XYZ Co. has previously obtained the appropriate message format, processing proceeds to step 416, described below.

Figure 5:
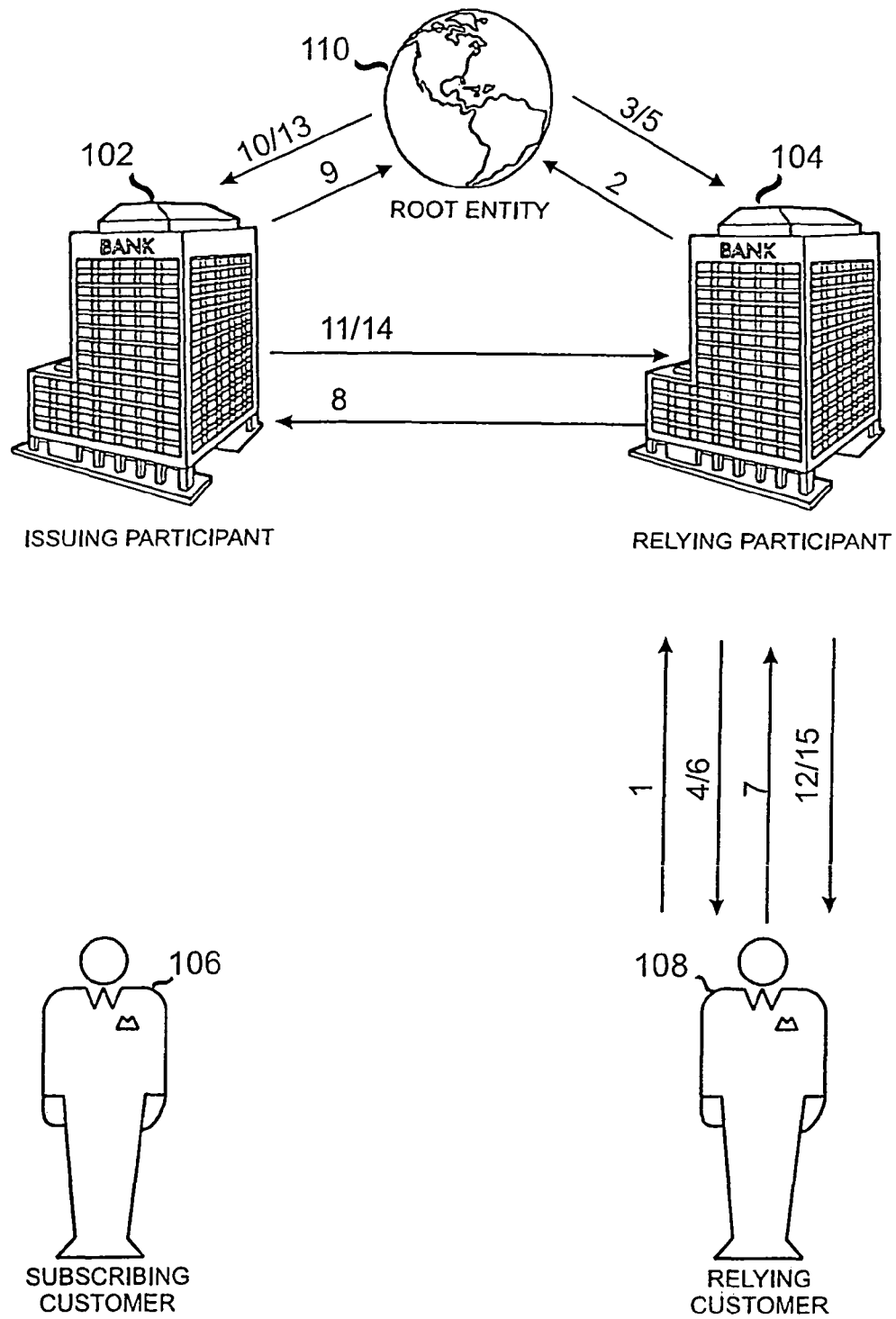
FIG. 5 illustrates a preferred embodiment of certain messages transmitted in the preferred embodiment of FIG. 4.
Figure 6A:
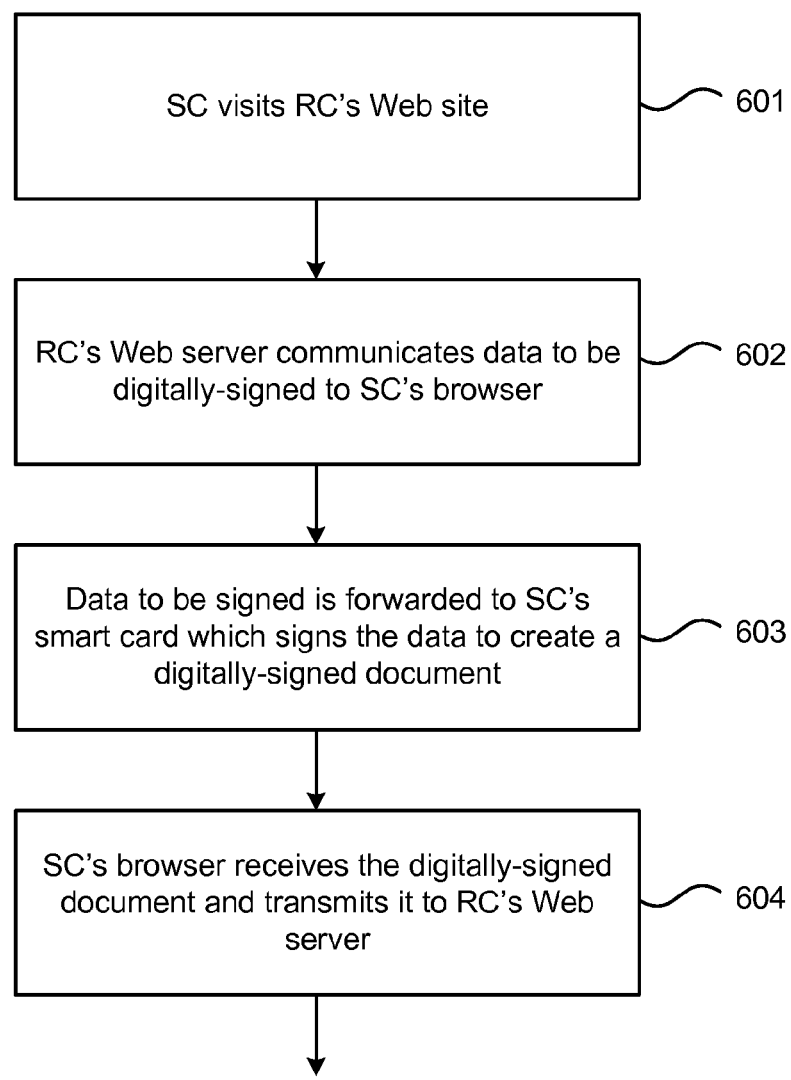
FIG. 6 illustrates a preferred embodiment of a process flow in which an authorization service and a certificate validation service are bundled together.
Figure 6B:
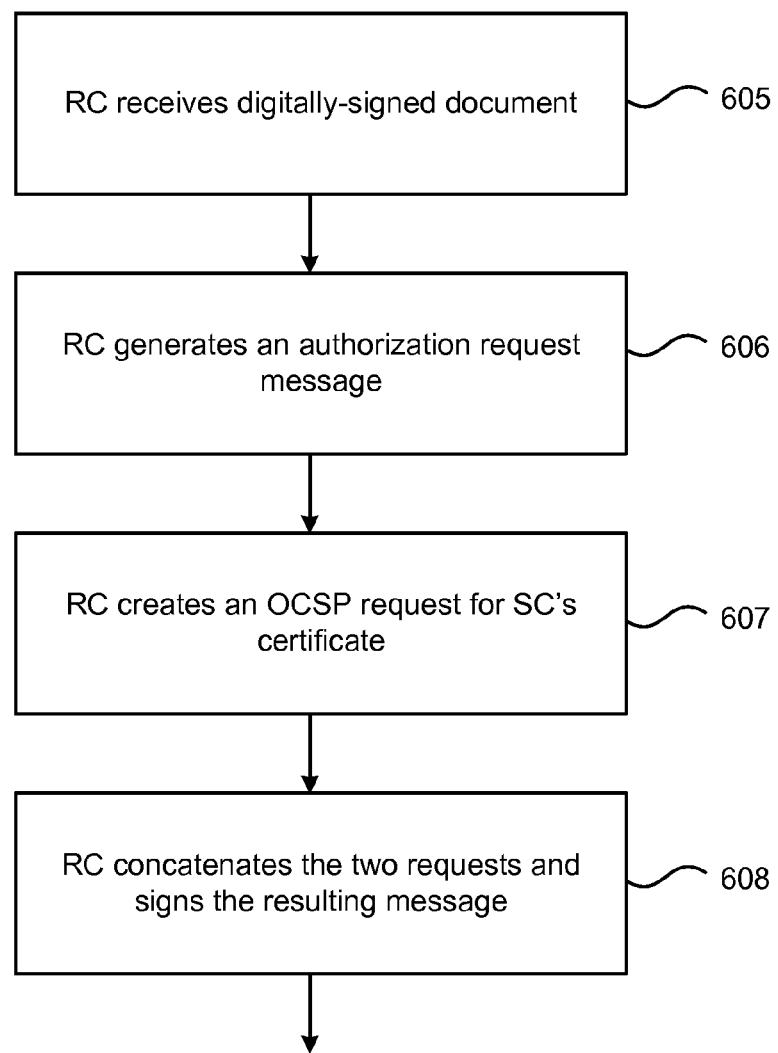
Figure 6C:
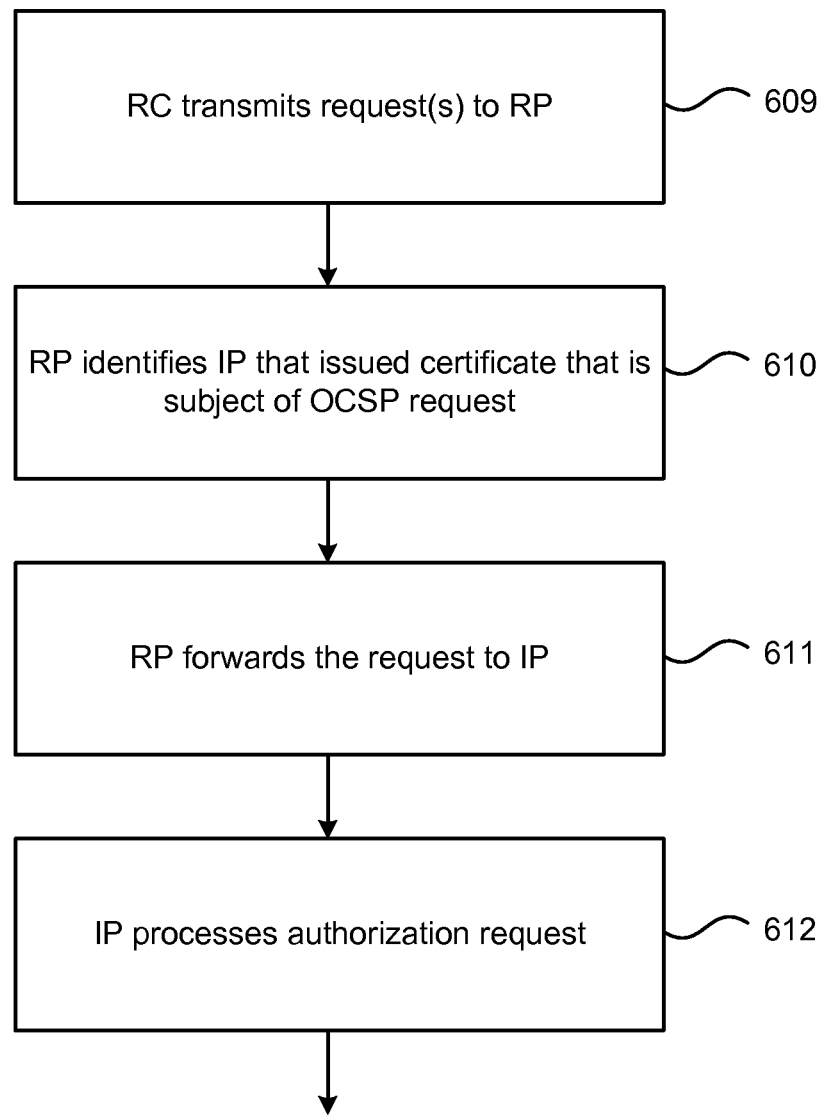
Figure 6D:
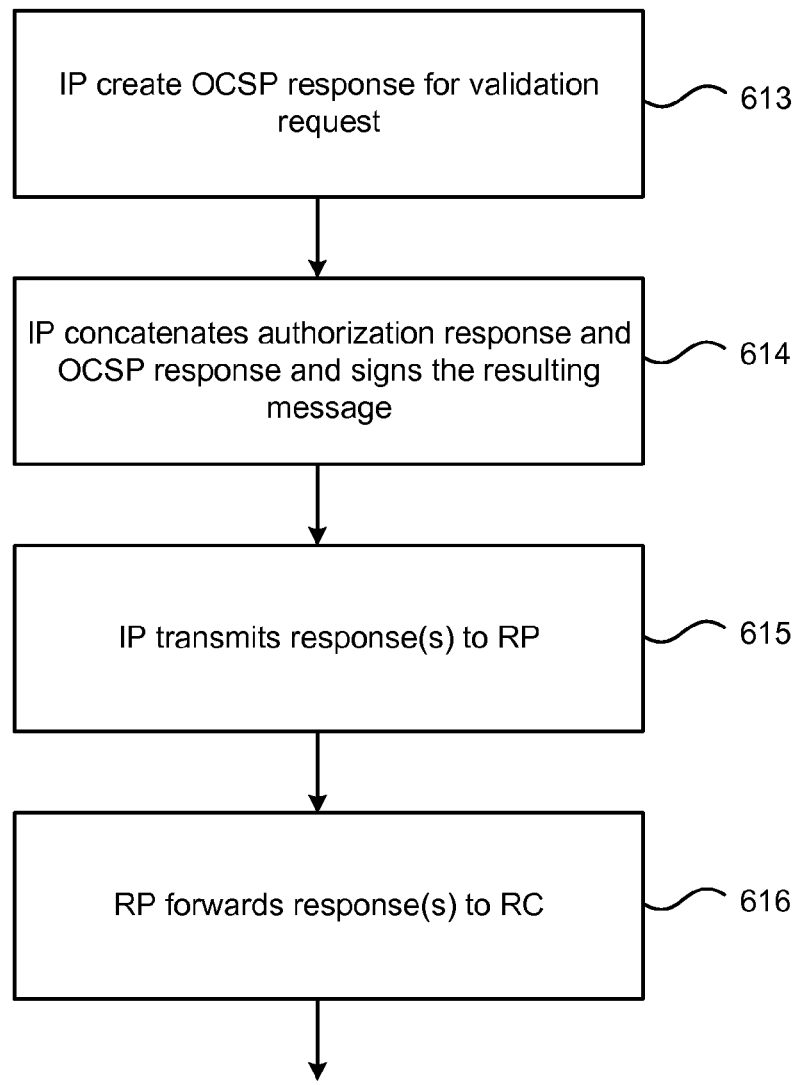
Figure 6E:
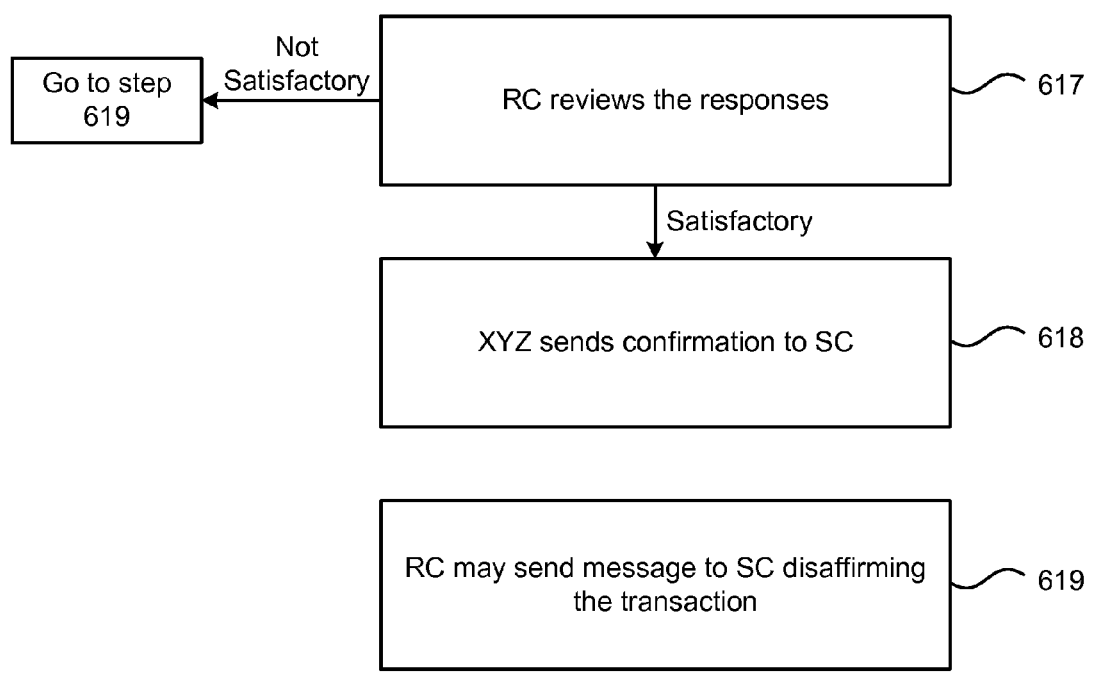

Otherwise, in step 408, XYZ Co. generates a request for the appropriate authorization-request message format, signs the request, and sends the request to Bank B (message 1 in FIG. 5). In step 409, Bank B transmits the request to root entity 110 (message 2 in FIG. 5).

In step 410, root entity 110 receives the request and retrieves from central repository 260 the access-control implementation rules developed by Bank A and ABC Co. for the authorization service identified in the request. In step 411, root entity 110 applies these access-control implementation rules to determine whether or not XYZ Co. is authorized to receive the requested authorization-request message format.

If XYZ Co. is not authorized to receive the requested message format, then, in step 412, root entity 110 generates a rejection message indicating this fact, signs it, and transmits it to Bank B (message 3 in FIG. 5). In step 413, Bank B transmits the rejection message to XYZ Co. (message 4 in FIG. 5), and processing concludes.

Otherwise, in step 414, root entity 110 retrieves from central repository 260 the requested authorization-request message format, creates a signed message that includes the requested message format, and transmits the message to Bank B (message 5 in FIG. 5). In step 415, Bank B transmits the message to XYZ Co. (message 6 in FIG. 5).

In step 416, XYZ Co. uses the authorization-request message format to generate an authorization request for some aspect of the transaction documented by the digitally-signed document.

Assuming for purposes of the present exemplary embodiment that the authorization service permits a relying customer to make a dynamic request to determine whether an employee of ABC Co. is authorized to purchase a particular type and value of goods, an exemplary dynamic authorization request message might include the following fields:

Authorization Request Message Code (indicating that the message is a request for authorization and specifying a particular authorization service by number)
Request Type (indicating whether the request is a static request or a dynamic request)
Request ID (unique identifier generated by relying customer 108)
Relying Customer Name (e.g., XYZ Co.)
Subscribing Customer Name (e.g., ABC Co.)
Subscribing Customer Employee (e.g., John Smith)
Transaction Type (e.g., purchase, rental, etc.)
Transaction Item
Transaction Amount An exemplary XML implementation of a dynamic authorization request generated for John Smith's authorization to purchase $200 worth of adhesive tape may be as follows:

<AuthorizationRequestServiceNo 12345>
  <RequestType Type="dynamic"/>
  <RequestId Id="0034021"/>
  <RCNameAndId Id="123456" Name="XYZ Co."/>
  <SCNameAndId Id="654321" Name=ABC Co."/>
  <SCEmployeeNameAndId Id="13579" Name="John Smith"/>
  <TransactionType Type="purchase"/>
  <TransactionItem Item="adhesive tape"/>
  <TransactionAmount Currency="USD" Amount="200"/>
</AuthorizationRequestServiceNo 12345>

Alternatively, assuming for purposes of the present exemplary embodiment that the authorization service permits a relying customer to make a static request to determine the purchasing authority of an employee of ABC Co., an exemplary static authorization request message might include the following fields:

Authorization Request Message Code (indicating that the message is a request for authorization and specifying a particular authorization service by number)
Request Type (indicating whether the request is a static request or a dynamic request)
Request ID (unique identifier generated by relying customer 108)
Relying Customer Name (e.g., XYZ Co.)
Subscribing Customer Name (e.g., ABC Co.)
Subscribing Customer Employee (e.g., John Smith)
Requested Attributes (indicating the attributes that are the subject of the authorization request)

An exemplary XML implementation of a static authorization request to determine the type and value of items that John Smith is authorized to purchase (i.e., his purchasing authority and purchasing limit) may be as follows:

<AuthorizationRequestServiceNo 12345>
  <RequestType Type="static"/>
  <RequestId Id="00255501"/>
  <RCNameAndId Id="123456" Name="XYZ Co."/>
  <SCNameAndId Id="654321" Name="ABC Co."/>
  <SCEmployeeNameAndId Id="13579" Name="John Smith">
  <RequestedAttributes Attributes="Purchasing Authority, Purchasing Limit"/>
</AuthorizationRequestServiceNo 12345>

Continuing with FIG. 4, in step 417, XYZ Co. signs the authorization request message and sends it to Bank B (message 7 in FIG. 5). In step 418, Bank B transmits the authorization request message to Bank A (message 8 in FIG. 5).

In step 419, Bank A receives the request and checks its repository $270_{IP}$ to determine whether or not it has the appropriate messaging specification data in order to generate a response to the authorization request. If Bank A has the appropriate messaging specification data, processing proceeds to step 427, described below.

Otherwise (which may occur, for example, if the authorization service that is the subject of the request was developed by a different system participant), then, in step 420, Bank A generates a request for the appropriate response message format, signs the request, and sends the request to root entity 110 (message 9 in FIG. 5).

In step 421, root entity 110 receives the request and retrieves from central repository 260 any applicable access-control implementation rules necessary to process the request. In step 422, root entity 110 applies these rules to determine whether or not it will release the requested authorization-response message format to Bank A.

If Bank A is not authorized to receive the requested message format, then, in step 423, root entity 110 generates a rejection message indicating this fact, signs it, and transmits it to Bank A (message 10 in FIG. 5). In step 424, Bank A generates a message indicating that it cannot process the authorization request, signs it, and transmits it to Bank B (message 11 in FIG. 5). In step 425, Bank B transmits the message to XYZ Co., and processing ends (message 12 in FIG. 5).

Otherwise, in step 426, root entity 110 retrieves from central repository 260 the requested authorization-response message format, creates a signed message that includes the requested message format, and transmits the message to Bank A (message 13 in FIG. 5).

In step 427, Bank A retrieves from directory 270$_{IP}$ the appropriate credential record for the individual that is the subject of the authorization request (e.g., John Smith). In addition, Bank A retrieves from directory 270$_{IP}$ any necessary definition and mapping information for processing the request. Bank A uses this information to process the authorization request from XYZ Co.

For example, if the authorization request seeks to determine whether John Smith is authorized to purchase $200 of adhesive tape, Bank A reviews John Smith's purchasing authority attributes (and any necessary related definition or mapping information) and his purchasing limit, and determines (on these facts) that John Smith is authorized to conduct the transaction.

It should be noted that, in the present exemplary embodiment, it is assumed that the purchasing limit attribute assigned to John Smith is a per-transaction limit. It will be recognized that subscribing customer 106 may alternatively or in addition assign to its employees time-based (e.g., monthly) or other purchasing limits. If, for example, John Smith was also assigned a monthly limit, Bank A would preferably track all purchases made by John Smith and maintain a running total of those purchases during the last month. Upon receipt of an authorization request for a specified transaction amount, Bank A would add this transaction amount to John Smith's running total for the month, compare the sum to John Smith's monthly purchasing limit, and issue a positive authorization only if the sum did not exceed the monthly purchasing limit.

In step 428, Bank A uses the authorization-response message format to generate an appropriate response to XYZ Co.'s authorization request. Continuing with the exemplary embodiment, a response to the dynamic authorization request described above may include the following fields:

Authorization Response Message Code (indicating that the message is an authorization response message and specifying a particular authorization service by number)

Request ID

Response (Boolean value such as Authorized or Not Authorized)

An exemplary XML implementation of the above response may be as follows:
<AuthorizationResponseServiceNo 12345>
   <RequestId Id="0034201"/>
   <Response>Authorized</Response>
</AuthorizationResponseServiceNo 12345>

A response to the static authorization request described above may include the following fields:

Authorization Response Message Code (indicating that the message is an authorization response message and specifying a particular authorization service by number)

Request ID

Credential Record

An exemplary XML implementation for such a response message may be:
<AuthorizationResponseServiceNo 12345>
   <RequestId Id="0034201"/>
   <EmployeeName>John Smith</EmployeeName>
   <EmployeeTitle>Office Manager</EmployeeTitle>
   <PurchasingAuthority>Office Supplies</PurchasingAuthority>
   <PurchasingLimit Currency="USD">75,000</PurchasingLimit>
</AuthorizationResponseServiceNo 12345>

In step 429, Bank A signs the authorization response message and sends it to Bank B (message 14 in FIG. 5). In step 430, Bank B transmits the authorization response message to XYZ Co. (message 15 in FIG. 5). If the authorization response is satisfactory to XYZ Co., then, in step 431, XYZ Co. sends a confirmation message for the transaction to John Smith at ABC Co. Otherwise, if the authorization response is not satisfactory to XYZ Co., then, in step 432, XYZ Co. may send a message to John Smith at ABC Co. disaffirming the transaction.

Process Flow for Bundled Authorization Service and Certificate Validation or Other System Services In a preferred embodiment, an authorization request by a relying customer 108 may preferably be bundled and processed concurrently with a request for another system service such as certificate validation. Preferred embodiments for validating a subscribing customer 106's certificate are described, for example, in copending U.S. application Ser. No. 09/657,605, filed Sep. 8, 2000, entitled System and Method for Certificate Validation and Other Services, which is hereby incorporated by reference. A summarized version of that certificate validation process is described below in connection with the bundled authorization/certificate validation services. This preferred embodiment is now described in connection with FIGS. 6-7.

Beginning with FIG. 6, in step 601, subscribing customer 106 visits relying customer 108's Web site. The parties preferably authenticate themselves to each other over an SSL session with their utility keys.

In step 602, Web server 220 communicates data to be digitally signed to browser 224 (e.g., a purchase order for an agreed-to transaction). In step 603, the data to be signed is forwarded to smartcard subsystem 226 which signs the data to create a digitally-signed document. In step 604, browser 224 receives the digitally-signed document and transmits it to Web server 220 or another appropriate location specified by relying customer 108. In a preferred embodiment, this signing process may be facilitated by using a signing interface 225 to invoke smartcard subsystem 226, as described in U.S. provisional application Ser. No. 60/224,994, filed Sep. 8, 2000, entitled Signing Interface Requirements, Smart Card Compliance Requirements, Warranty Service Functional Requirements, and Additional Disclosure, which is hereby incorporated by reference.

In step 605, relying customer 108 receives the digitally-signed document. In step 606, relying customer 108 generates an authorization request message in accordance with steps 407-416, as described above. In step 607, relying customer 108 creates an OCSP request for subscribing customer 106's digital certificate. In step 608, relying customer 108 concatenates the two requests and signs the resulting message. In a preferred embodiment, the messaging specification for the authorization service may include a single request that seeks both authorization and certificate validation. In step 609, relying customer 108 transmits the request(s) to relying participant 104 (message 1 in FIG. 7).

Figure 7:
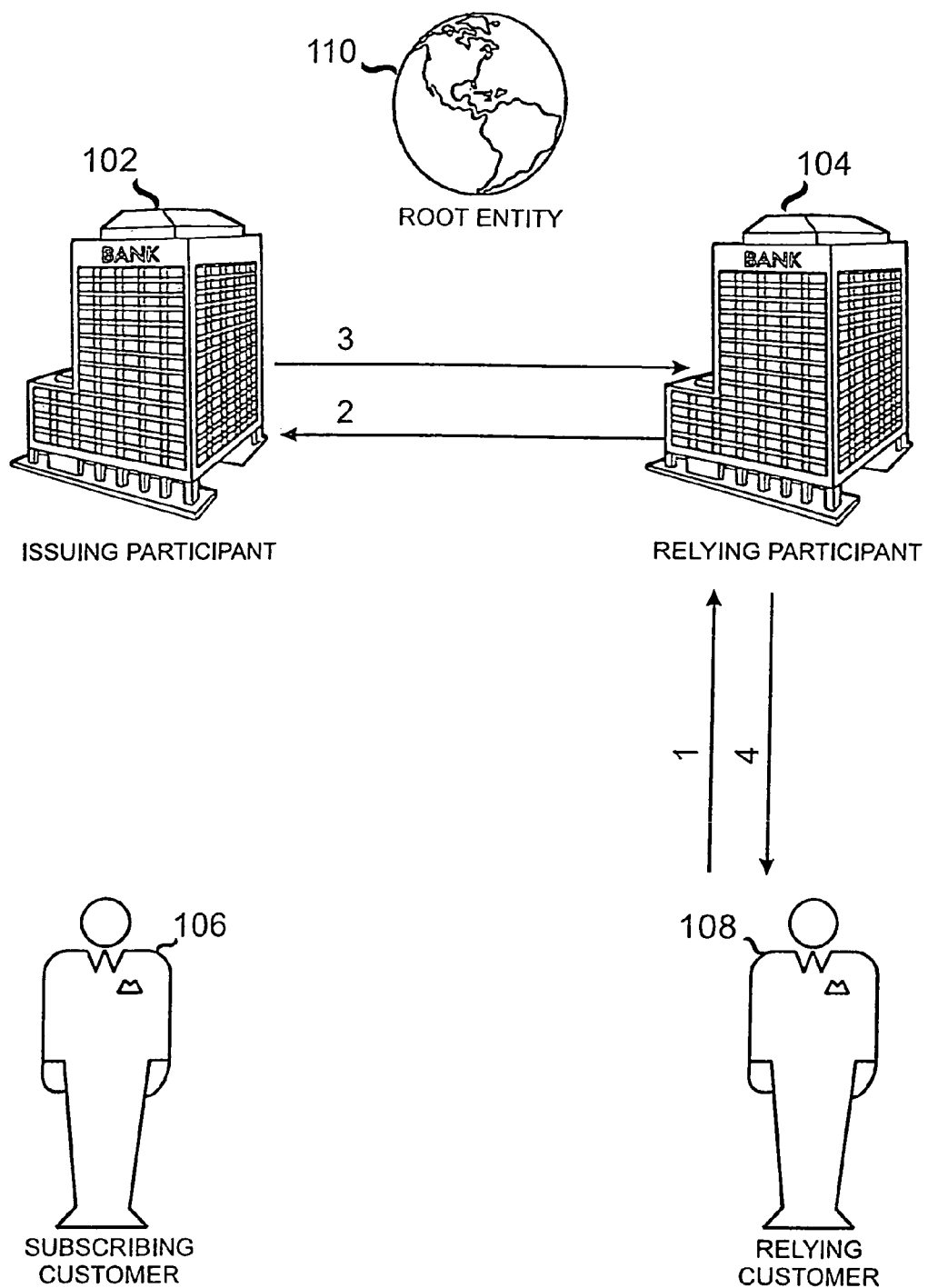
FIG. 7 illustrates a preferred embodiment of certain messages transmitted in the preferred embodiment of FIG. 6.

In step 610, relying participant 104 identifies the issuing participant that issued the digital certificate that is the subject of the OCSP request and, in step 611, transmits the request to that participant (i.e., issuing participant 102 in the present example) (message 2 in FIG. 7).

In step 612, issuing participant 102 processes the authorization request in accordance with steps 419-428 as described above. In step 613, issuing participant creates an OCSP response for the validation request using its OCSP responder 204$_{IP}$. In step 614, issuing participant 102 concatenates the authorization response message and OCSP response and signs the resulting message. In a preferred embodiment, the messaging specification for the authorization service may include a single response message for responding to a bundled authorization/certificate validation request.

In step 615, issuing participant 102 transmits the response(s) to relying participant 104 (message 3 in FIG. 7). In step 616, relying participant 104 transmits the response(s) to relying customer 108 (message 4 in FIG. 7). In step 617, relying customer 108 reviews the response(s). If the authorization and validation responses are satisfactory to relying customer 104, then, in step 618, XYZ Co. sends a confirmation message for the transaction to subscribing customer 106. Otherwise, if one or more of the service responses are not satisfactory to relying customer 108, then, in step 619, relying customer 108 may send a message to subscribing customer 106 disaffirming the transaction.

It will be recognized that, in other preferred embodiments, system services other than certificate validation may be processed concurrently with the authorization service. These system services may, for example, include a warranty service.

It should be noted that, in a preferred embodiment, all inter-entity messages transmitted and received by participants 102, 104, and root entity 110 may be routed through an appropriate system component adapted for such processing, such as, for example, transaction coordinator 202.

It should be noted that although the preferred embodiments described above speak primarily in terms of a transaction conducted by an individual employee of subscribing customer 106, the transaction may alternatively be automatically conducted by an appropriate server maintained by subscriber customer 106. In that case, relying customer 108 may, for example, seek an authorization that the subscribing customer will stand behind a transaction conducted with the server.

It should also be recognized that although in the preferred embodiments described above subscribing customer 106 and issuing participant 102 work together to design a desired authorization service, in an alternative preferred embodiment, issuing participant 102 (or other entities such as root entity 110) may design in advance one or more authorization services and seek approval from the policy management authority for them. Once approved, these may serve as "off-the-shelf" authorization services that may be offered to a subscribing customer 106. In particular, it may be desirable to design and seek approval for industry-specific authorization services that an issuing participant expects will be popular with its customers.

While the invention has been described in conjunction with specific embodiments, it is evident that numerous alternatives, modifications, and variations will be apparent to those skilled in the art in light of the foregoing description.

The invention claimed is:

1. A method for providing authorization concerning electronic commerce transactions, said method comprising:
    (a) establishing, for an issuing participant and a subscribing customer of the issuing participant, an authorization service that includes both a messaging specification and a set of rules governing use of the authorization service by:
        (i) transmitting, by a processor, an electronic communication, by a transaction coordinator associated with the issuing participant to a transaction coordinator executed by a processor associated with a root certification authority over a communications network,
        wherein the processor of the root certification authority is configured to issue a digital certificate for the issuing participant,
        wherein the electronic communication comprises a request to approve a proposed authorization service confirming authority of at least one of an individual and a computer to transact business as an agent on behalf of the subscribing customer,
        wherein the proposed authorization service comprises the messaging specification and the set of rules governing use of the authorization service,
        wherein a set of parameters defining the proposed authorization service comprises information facilitating a response from the issuing participant to the authorization request confirming authority of the at least one individual and the computer to transact business as an agent on behalf of the subscribing customer, and
        wherein the messaging specification defines a format for the authorization request;
        (ii) receiving, by the processor, by a policy management authority module, the electronic communication;
        (iii) determining, by the processor of the policy management authority module, that the proposed authorization service complies with operating rules and specifications promulgated by the root certification authority,
        approving, by the processor of the policy management authority module, the proposed authorization service responsive to determining that the proposed authorization service complies with operating rules and specifications promulgated by the root certification authority;
        (iv) storing by the processor, at a data directory comprising a non-transitory machine-readable storage medium communicatively coupled to the processor executing the transaction coordinator of the root certification authority, a copy of an approved messaging specification and approved implementation rules of the approved proposed authorization service and electronically notifying, by the policy management authority, the issuing participant via the communication network of the approval;
        (v) receiving, by the processor, approval of the proposed authorization service from the policy management authority, responsive to receiving approval of the proposed authorization service from the policy management authority, storing, by the processor associated with the issuing participant, the proposed authorization service at a data directory, wherein the proposed authorization service comprises the copy of the approved messaging specification and the copy of the approved implementation rules of the authorization service, and notifying, by the processor of the issuing participant, the subscribing customer of the approval;

(vi) supplying attribute information to the processor of issuing participant and populating one or more credential records stored in a memory by the issuing participant computer associated with one or more individuals authorized to act on behalf of the subscribing customer; and (b) operating the authorization service established within a trust model by:

(i) receiving, by a processor of a web server of a relying customer, a digitally signed document comprising a digital certificate;

(ii) transmitting, by the processor from the web server of the relying customer to a transaction coordinator associated with the relying participant, a request for formatting information concerning a proper format for an authorization request according to the set of rules governing the use of the authorization service;

(iii) transmitting, from the processor executing the transaction coordinator of the relying participant to the processor executing the transaction coordinator of the root certification authority, the request for formatting information;

(iv) receiving, by the processor executing the transaction coordinator of the root certification authority, the request for formatting information;

(v) applying, by the processor executing the transaction coordinator of the root certification authority, access control rules authenticating the relying customer authorization to receive the requested formatting information;

(vi) transmitting, by the processor executing the transaction coordinator of the root certification authority, the requested formatting information to the processor executing the transaction coordinator of the relying participant;

(vii) receiving, by the processor executing the transaction coordinator of the relying participant, the requested formatting information and transmitting the requested formatting information to the web server of the relying customer;

(viii) responsive to receipt of the formatting information concerning the proper format for the authorization request, formatting, by the web server of the relying customer, a verification request;

(ix) transmitting, by the processor of web server of the relying customer, the formatted verification request to the transaction coordinator of the relying participant;

(x) the processor executing the transaction coordinator of the relying participant forwarding by the processor the request for verification to the transaction coordinator of the issuing participant;

(xi) receiving by the processor the request for verification, responsive to the receipt of the request for verification, examining, by the processor executing the transaction coordinator of the issuing participant, the credential records and determining authorization of individuals to conduct transactions involving digitally signed documents on behalf of the subscribing customer;

(xii) verifiying by the processor the individual is associated with a credential record;

authorizing, by the processor executing the transaction coordinator of the issuing participant, the individual associated with the subscribing customer to conduct the transaction involving the digitally signed document on behalf of the subscribing customer responsive to verification the individual is associated with a credential record; and (xiii) transmitting, by the processor executing the transaction coordinator of the issuing participant, to the transaction coordinator of the relying participant confirmation of said authorization; and (xiv) the processor executing the transaction coordinator of the relying participant transmitting the confirmation of authorization to the web server of the relying customer.

2. The method of claim 1, wherein the proposed authorization service is jointly developed by the subscribing customer and the certification authority.

3. The method of claim 1 wherein each credential record comprises at least one pair of a role of an individual and an attribute associated with the individual; wherein: the role of the individual indicates the authority of the individual to execute an action; and the attribute represents a particular value assigned to the role for the respective individual.

4. The method of claim 3 wherein at least one role is a role from the group of roles consisting of name, title, purchasing authority, and purchasing limit.

5. The method of claim 1 wherein the authority is the authority of the individual to sign a particular document.

6. The method of claim 1 wherein the authority is the authority of the individual to undertake a particular financial or performance obligation on behalf of the subscribing customer.

7. The method of claim 1 wherein the authority is the authority of the individual to purchase a particular class of goods.

8. The method of claim 1 wherein the authority is the authority of the individual to sell a particular class of goods.

9. The method of claim 1 wherein the authority is the authority of the individual to negotiate a particular type of contract.

10. The method of claim 1 wherein the authority is the authority of the individual to perform in a particular manner on behalf of the subscribing customer.

11. The method of claim 1, wherein the request for verification that the individual is authorized to conduct the transaction comprises a dynamic request.

12. The method of claim 1, wherein the request for verification concerning the individual comprises a static request for an attribute of a role associated with the individual.

13. The method of claim 1, wherein after receiving the request, information pertaining to definitions of attributes is used by the transaction coordinator of the issuing participant in preparing an authorization response.

14. The method of claim 1, wherein after receiving the request, information pertaining to mapping terminology from a second customer to the subscribing customer is used by the transaction coordinator of the issuing participant in preparing an authorization response.

15. The method of claim 14, wherein the information pertaining to mapping terminology comprises dynamic mapping information.

16. The method of claim 14, wherein the request seeks confirmation that the individual is authorized to purchase goods on behalf of the subscribing customer.

17. The method of claim 14, wherein the authorization request is bundled with a certificate validation request for the digital certificate of the subscribing customer.

18. The method of claim 17, wherein the authorization response indicates status of the digital certificate of the subscribing customer.

\* \* \* \* \*